US012552891B2

(12) United States Patent
Robic et al.

(10) Patent No.: US 12,552,891 B2
(45) Date of Patent: Feb. 17, 2026

(54) NON-DEGRADABLE EMBOLISATION MICROSPHERE

(71) Applicant: GUERBET, Villepinte (FR)

(72) Inventors: Caroline Robic, Nogent sur Marne (FR); Mohsen Dahesh, Epinay sur Seine (FR)

(73) Assignee: GUERBET, Villepinte (FR)

( * ) Notice: Subject to any disclaimer, the term of this patent is extended or adjusted under 35 U.S.C. 154(b) by 889 days.

(21) Appl. No.: 17/754,531

(22) PCT Filed: Oct. 7, 2020

(86) PCT No.: PCT/EP2020/078178
§ 371 (c)(1),
(2) Date: Apr. 5, 2022

(87) PCT Pub. No.: WO2021/069527
PCT Pub. Date: Apr. 15, 2021

(65) Prior Publication Data
US 2023/0272142 A1 Aug. 31, 2023

(30) Foreign Application Priority Data

Oct. 7, 2019 (EP) .................................. 19306307

(51) Int. Cl.
*C08F 226/10* (2006.01)
*C08F 293/00* (2006.01)

(52) U.S. Cl.
CPC ........ *C08F 226/10* (2013.01); *C08F 293/005* (2013.01)

(58) Field of Classification Search
CPC ........................... C08F 226/10; C08F 293/005
See application file for complete search history.

(56) References Cited

U.S. PATENT DOCUMENTS

2007/0237741 A1 10/2007 Figuly et al.
2009/0297612 A1 12/2009 Koole et al.

FOREIGN PATENT DOCUMENTS

| CN | 101820861 A | 9/2010 |
|---|---|---|
| JP | 6-508139 A | 9/1994 |
| JP | 2014-511427 A | 5/2014 |
| WO | WO 92/21327 A1 | 12/1992 |
| WO | WO 2009/014549 A1 | 1/2009 |
| WO | WO 2012/120138 A1 | 9/2012 |
| WO | WO 2012/120139 A1 | 9/2012 |
| WO | WO 2019/164397 A1 | 8/2019 |

OTHER PUBLICATIONS

Osuga et al., "Transarterial Embolization for Large Hepatocellular Carcinoma with Use of Superabsorbent Polymer Microspheres: Initial Experience", (2002) J. Vase Interv Radiol. vol. 13, No. 9, 929-934.
A. Laurent, "Microspheres and Nonspherical Particles for Embolization", Techniques in vascular and interventional radiology, 2007, 248-256.
A. Laurent, Agents d'embolisation, EMC-Radiologie et imagerie médicale-principes et technique-radioprotection 2014; 9(1): 1-11).
Ketie Saralidze et al. "Radio-Opaque and Surface-Functionalized Polymer Microparticles: Potentially Safer Biomaterials for Different Injection Therapies," Biomacromolecules, US, vol. 7, No. 11 (2006), pp. 2991-2996.
International Search Report mailed Dec. 9, 2020, in PCT Application No. PCT/EP2020/078178.
Li, "Functional and Intelligent Polymer Materials," National Defense Industry Press, 1st Edition, 2006, 17 pages total, with an English translation.
Dollendorf et al., "Polymerization of novel methacrylated anthraquinone dyes," Beilstein Journal of Organic Chemistry, vol. 9, Feb. 28, 2013, pp. 453-459.
Korean Office Action for Korean Application No. 10-2022-7014952, dated May 7, 2025, with English translation.

*Primary Examiner* — Zohreh A Fay
(74) *Attorney, Agent, or Firm* — Birch, Stewart, Kolasch & Birch, LLP

(57) ABSTRACT

The invention relates to non-biodegradable embolisation microspheres comprising a cross-linked matrix, the matrix being based on at least: a) from 20% to 95% of hydrophilic monomer; b) from 1% to 15% of a non-biodegradable hydrophilic cross-linking monomer; and c) from 1.5% to less than 6% of transfer agent selected from alkyl halides and cycloaliphatic or aliphatic thiols having in particular from 2 to 24 carbon atoms, and optionally having another functional group selected from amino, hydroxy and carboxy groups. The invention further relates to a pharmaceutical composition comprising non-biodegradable embolisation microspheres according to the invention in conjunction with a pharmaceutically acceptable vehicle, advantageously for parenteral administration. The invention further relates to a kit comprising a pharmaceutical composition comprising non-biodegradable embolisation microspheres according to the invention in conjunction with a pharmaceutically acceptable vehicle for parenteral administration, and at least one injection means.

20 Claims, 3 Drawing Sheets

NON-DEGRADABLE EMBOLISATION MICROSPHERE

FIELD OF THE INVENTION

The present invention relates to nonbiodegradable embolization microspheres comprising a crosslinked polymer matrix advantageously intended to be injected in an individual, and optionally intended for controlled release of active substances or macromolecules.

PRIOR ART

Therapeutic vascular occlusion (i.e. embolization) is used for preventing blood flow in a region of the body, which leads to ischemia. It may be administered by means of catheters allowing positioning of particulate occlusion agents in the circulatory system. It has a variety of medical applications such as treatment of vascular malformations, hemorrhagic processes or tumors, including, for example, uterine fibromas, primary or secondary liver tumors. For example, vascular occlusion may cause tumoral necrosis and avoid a more invasive operation. This occlusion technique may also be coupled to delivery of an anticancer agent in the context of chemoembolization. This makes it possible to increase the local concentration of a drug by targeted injection, as well as its residence time in the tumor. In the case of vascular malformations, vascular occlusion makes it possible to normalize blood flow to the normal tissues and aid surgery, limiting the risk of hemorrhage. In hemorrhagic processes, vascular occlusion may lead to a reduced flow rate, which promotes healing of the arterial wound.

Commercial embolic agents for vascular occlusion comprise embolization liquids (acrylic glues, gels), mechanical devices and embolization particles. The choice of a specific material depends on many factors, such as the type of lesion to be treated, the type of catheter to be used and the need for temporary or permanent embolization.

These embolization agents are conventionally introduced into a blood vessel via a catheter, in particular a microcatheter, whose diameter is less than that of the vessel to be treated. In the case of solid embolization agents, such as particles, their shape must therefore allow them to circulate within said catheter, and then, once released, occupy a sufficient volume to produce occlusion of the vessel over its entire diameter.

The shape and size of the embolic agents are factors in the precision of the targeted region. In the case of particles, it has been found that when they are spherical and of a suitable size for the vascular lumen, they create total embolization and are only present in the targeted tissue.

In the prior art there are microspheres whose development has taken place in parallel with the development of increasingly fine microcatheters that allowed more-distal arterial access. Depending on the size of the microspheres used, the practitioner may proceed with vascular targeting, performing more or less distal occlusion. Embolization may be set up at selected levels. For example, in the case of tumors, vessels destined for the tumor can also be occluded more easily, while avoiding vessels intended for normal tissues.

These microspheres may be biodegradable for the purpose of performing temporary embolization. The main difficulties encountered with these biodegradable microspheres are:
the difficulty of controlling the rate of degradation, which may be between some hours and some months, depending on the microsphere;
controlled disappearance of the microspheres without debris or toxicity for the organism and
the difficulty of loading these microspheres with therapeutic agents.

Moreover, undesirable chain transfer reactions within the polymer microspheres may cause irreversible crosslinking, possibly leading to the formation of a nonabsorbable polymer.

Thus, in applications WO 2012/120139 and WO 2012/120138, it is described that adding a transfer agent to the solution of monomers during preparation of biodegradable microspheres makes it possible to avoid these undesirable secondary reactions and therefore preserve the degradation properties of the embolization microspheres.

In contrast to these biodegradable embolization microspheres, which have the advantage of obtaining temporary embolization, the nonbiodegradable embolization microspheres allow embolization for permanent purposes.

Various nonbiodegradable microspheres were tested in the 1960s, with the aim of performing embolization (lead, stainless steel, and silicone beads). However, the small size of these microspheres and considerable reflux in healthy organs that are not targeted increased the levels of complications in patients.

Nonbiodegradable microspheres exist that are based on a polymer, trisacryl (N-acryloyl-2-amino-2-hydroxymethyl-propane-1,3-diol), and gelatin, which may be of porcine origin. This is the product Embosphere® (Biosphere Medical), one of the drawbacks of which is the presence of gelatin, which may potentially be of porcine origin.

Nonbiodegradable microspheres based on acrylic copolymers and PVA have also been proposed for permanent embolization (Osuga et al., (2002) J. Vase Interv Radiol. 13: 929-34). These are, for example, Quadrasphere® microspheres from Biosphere Medical, which are supplied in dry form and then swell after being mixed with normal saline solution and/or iodinated contrast products before injection via a catheter. Their final size after swelling varies as a function of the ionic charge of the medium (respectively ×2 or ×4 relative to their initial size in a saline solution or a contrast product). However, the swelling of the microspheres is not controlled and the final size is too variable to allow control of their volume after implantation, which limits their use in embolization. In fact, it has been demonstrated that there is a correspondence between the size of the microspheres and the diameter of the vessels obstructed. For precise targeting of the vessels to be embolized, it is preferable to use an appropriate size of microspheres (Laurent et al., 2007).

Thus, the embolization microspheres must be spherical and must be calibrated. "Calibrated" means that the microspheres must be classifiable according to their size after swelling. The practitioner then selects the microspheres of a size corresponding to the size of the vessel or of the malformation to be embolized (Laurent et al., 2007). Any morphological defect of these embolization microspheres may lead to occlusion of the catheter or may adversely affect their embolization properties.

The resistance to compression and the elasticity of the embolization microspheres are also important. In fact, they must be injectable via a microcatheter with a diameter less than their diameter, while regaining their shape and their initial size on discharge from the microcatheter, when they are injected into a blood vessel. It has been demonstrated that low elasticity and low resistance to compression reduce the level of occlusion in vivo (Laurent et al., 2007).

Young's modulus expresses resistance to compression, or compressibility. It has been demonstrated that the value of Young's modulus of the microspheres is directly linked to the fact that they will be localized in a more or less distal part of the vessel in which they are injected (Laurent A., Agents d'embolisation [Embolization agents]. EMC-Radiologie et imagerie medicale-principes et technique-radioprotection 2014; 9(1): 1-11).

Microspheres of low compressibility will provide embolization near the injection site whereas microspheres of high compressibility will provide embolization remote from the injection site.

Tests in vitro have shown that the Embosphere® microspheres from Biosphere Medical, which are of low compressibility, create embolization at the level of the proximal zones of the vessel in which they are injected. Conversely, the Contour SE® microspheres from Boston Scientific, which deform easily, embolize zones of the vessel that are farther from the injection site.

One of the problems encountered with microspheres that are too compressible, and therefore too deformable, is that they may move inside the vessel under the pressure of the blood flow and this makes their localization uncertain. However, microspheres of low compressibility, and therefore not very deformable, could be difficult to inject or may not return to their initial shape after injection.

In order to target a specific embolization site, the compressibility of the microspheres must be controlled.

Moreover, in order to be injectable, the microspheres are generally suspended in a mixture of nonionic iodinated contrast product and buffer solution. For this purpose, radiologists generally use a mixture of 50% of contrast product and 50% of normal saline solution, bicarbonate buffer or phosphate buffer. To guarantee their injectability, the microspheres must be suspended homogeneously in this 50/50 solution. If the microspheres sediment or, conversely, float to the surface of the solution, the resultant suspension is inhomogeneous and unstable, and therefore cannot be injected in the patient.

It is thus advantageous for microspheres to have a suitable density to allow homogeneous suspension in a mixture comprising 50% of contrast product and 50% of normal saline solution, bicarbonate buffer, phosphate buffer or tris buffer (tris(hydroxymethyl)aminomethane).

There is therefore a great need for nonbiodegradable embolization microspheres that:
 are of calibrated size,
 consist of biocompatible materials without risk of allergy, and have mechanical properties, in particular degree of swelling, elasticity and compressibility, suitable for injection via a catheter or a microcatheter and which can return to their initial shape after injection while avoiding embolization remote from the target site.

It is, moreover, necessary for them to be capable of being loaded with active substances while maintaining their mechanical properties.

SUMMARY OF THE INVENTION

The present invention makes it possible to meet these needs by proposing embolization microspheres comprising a hydrophilic crosslinked polymer matrix, which are nonbiodegradable, solid, calibrated, elastic, compressible and have a controlled degree of swelling that is sufficient for permanent, targeted embolization.

The mechanical properties (swelling, elasticity, solidity, resistance to compression) of the microspheres of the invention make them suitable for injection and able to supply a sufficient and permanent level of embolization when they are injected into the vasculature of a mammal, preferably a human being.

The present invention mainly relates to nonbiodegradable embolization microspheres comprising a crosslinked polymer matrix, said crosslinked matrix being based on at least:
a) 20% to 95% of hydrophilic monomer selected from N-vinylpyrrolidone, and a monomer of the following formula (I)

$$(CH_2=CR_1)-CO-D \qquad (I)$$

in which:
 D represents O—Z or NH—Z, Z representing $(C_1-C_6)$ alkyl, $-(CR_2R_3)_m-CH_3$, $-(CH_2-CH_2-O)_m-H$, $-(CH_2-CH_2-O)_m-CH_3$, $-C(R_4OH)_m$ or $-(CH_2)_m-NR_5R_6$ with m representing an integer from 1 to 30;
 $R_1$, $R_2$, $R_3$, $R_4$, $R_5$ and $R_6$ represent, independently of one another, H or a $(C_1-C_6)$alkyl;
b) 1% to 15% of a nonbiodegradable, linear or branched hydrophilic crosslinking monomer of the following formulas (IIa) or (IIb):

$$(CH_2=CR_7)CO-NH-A-HN-OC(CR_8=CH_2) \qquad (IIa), or$$

$$(CH_2=CR_7)CO-O-A-O-OC(CR_8=CH_2) \qquad (IIb),$$

in which $R_7$ and $R_8$ represent, independently of one another, H or a $(C_1-C_6)$alkyl;
and
A represents, alone or with at least one of the atoms to which it is bound, a $(C_1-C_6)$alkylene, a polyethylene glycol (PEG), a polysiloxane, a poly(dimethylsiloxane) (PDMS), a polyglycerol ester (PGE) or a bisphenol A.
and
c) 1.5% to less than 6% of transfer agent selected from alkyl halides and cycloaliphatic or aliphatic thiols having in particular from 2 to 24 carbon atoms, and optionally having another functional group selected from the amino, hydroxy and carboxy groups,
the percentages of the monomers a) and b) being given in moles relative to the total number of moles of monomers and the percentages of compound c) being given in moles relative to the number of moles of the hydrophilic monomer a).

In the context of the present invention, addition of a transfer agent during polymerization of the crosslinked matrix of the microspheres according to the invention makes it possible to increase the degree of swelling of the microspheres. The increase in the degree of swelling leads to a decrease in dry extract of the microspheres for a given volume, and therefore a higher proportion of water, which facilitates their injection. Surprisingly, the presence of this transfer agent improves the elastic properties as well as the properties of swelling and resistance to compression. The inventors have discovered that the addition of 1.5 mol % to less than 6 mol % relative to the number of moles of the hydrophilic monomer a), preferably 1.5% to 4.5%, preferably 3%, of a transfer agent selected from those mentioned above in the reaction mixture for polymerization of a crosslinked matrix comprising a hydrophilic polymer makes it possible to improve the mechanical properties of the nonbiodegradable embolization microspheres, i.e. increase their swelling, their elasticity, their solidity and improve their resistance to compression.

These characteristics allow injection of the microspheres of the invention in an individual using a catheter or a microcatheter, and production of targeted embolization that is total and definitive.

The inventors have discovered in particular that the amount of transfer agent added to the reaction mixture must be strictly controlled to meet the needs mentioned above.

Thus, the degree of swelling, the elasticity and the compression of the microspheres are optimal starting from 1.5% of transfer agent in moles relative to the number of moles of the hydrophilic monomer a) present in the reaction mixture. At a level less than 1.5%, the microspheres obtained are not flexible enough to allow injection by microcatheter.

When the transfer agent is present in amounts of 6% or more in the reaction mixture, the nonbiodegradable embolization microspheres are too compressible, they are not solid enough and they break.

Elasticity is also an important parameter. Microspheres of low elasticity will not be deformed much by the pressure of the vascular wall and will remain localized in the proximal zone of the vessel in which they are injected.

The present invention also relates to embolization microspheres loaded with active substances, thus making it possible to combine vascular occlusion and delivery of an active substance.

The present invention further relates to a pharmaceutical composition comprising nonbiodegradable embolization microspheres as defined above, in association with a pharmaceutically acceptable vehicle, advantageously for administration by injection.

The present invention also relates to a kit comprising a pharmaceutical composition as defined above and at least one means of injection of said composition, for parenteral administration of said composition.

The present invention also relates to a kit comprising on the one hand a pharmaceutical composition as defined above and on the other hand a contrast agent for imaging by X-ray, by magnetic resonance or by ultrasonography, and optionally at least one means of injection for parenteral administration.

DETAILED DESCRIPTION

The expression "matrix based on" means of course a matrix comprising the mixture and/or the product of reaction between the base constituents used for heterogeneous polymerization of this matrix, preferably only the product of reaction between the different base constituents used for this matrix, certain of which may be intended to react or are likely to react with one another or with their close chemical environment, at least partly, during the different steps of the method of manufacture of the matrix, in particular during the polymerization step. Thus, the base constituents are the reactants that are intended to react with one another during polymerization of the matrix. The base constituents are therefore added to a reaction mixture optionally further comprising a solvent or a mixture of solvents and/or other additives such as at least one salt and/or at least one polymerization initiator and/or at least one stabilizer such as PVA. In the context of the present invention, the reaction mixture comprises at least the monomers a), b) and the transfer agent c) mentioned in the present description as base constituents and at least one solvent, preferably a mixture of solvents comprising an aqueous solvent and an organic solvent such as a nonpolar aprotic solvent, for example a water/toluene mixture. Optionally, the reaction mixture comprises a polymerization initiator for example such as t-butyl peroxide, benzoyl peroxide, azobiscyanovaleric acid (also called 4,4'-azobis(4-cyanopentanoic) acid), AIBN (azobisisobutyronitrile), 1,1'-azobis(cyclohexane carbonitrile) or one or more thermal initiators such as 2-hydroxy-4'-(2-hydroxyethoxy)-2-methylpropiophenone (106797-53-9); 2-hydroxy-2-methylpropiophenone (Darocur® 1173, 7473-98-5), 2,2-dimethoxy-2-phenylacetophenone (24650-42-8), 2,2-dimethoxy-2-phenyl acetophenone (Irgacure®, 24650-42-8) or 2-methyl-4'-(methylthio)-2-morpholinopropiophenone (Irgacure®, 71868-10-5).

Thus, according to the present invention, the matrix is at least based on the monomers a), b) and the transfer agent c) mentioned in the present description, these compounds therefore being base constituents.

Thus, in the present description, the expressions similar to "the [base constituent X] is in particular added to the reaction mixture in an amount from YY to YYY %" and to "the crosslinked matrix is in particular based on the [base constituent X] in an amount from YY to YYY %" are interpreted similarly. Moreover, the expressions similar to "the reaction mixture comprises at least [the base constituent X]" and to "the crosslinked matrix is based on at least [the base constituent X]" are interpreted similarly.

"Organic phase" of the reaction mixture means, in the sense of the present invention, the phase comprising the organic solvent and the compounds that are soluble in said organic solvent, in particular the monomers, the transfer agent and the polymerization initiator.

"($C_X$-$C_Y$)Alkyl group" means, in the sense of the present invention, a linear or branched, saturated monovalent hydrocarbon-containing chain, comprising X to Y carbon atoms, X and Y being integers between 1 and 36, preferably 1 and 18, in particular 1 and 6. As examples, mention may be made of the methyl, ethyl, propyl, isopropyl, butyl, isobutyl, sec-butyl, tert-butyl, pentyl or hexyl groups.

"($C_X$-$C_Y$)Aryl" means, in the sense of the present invention, an aromatic hydrocarbon-containing group, preferably comprising from X to Y carbon atoms, and comprising a ring or several fused rings, X and Y being integers between 5 and 36, preferably 5 and 18, in particular 5 and 10. As examples, we may mention the phenyl or naphthyl groups.

"($C_X$-$C_Y$) Heteroaryl" means, in the sense of the present invention, an aromatic group comprising X to Y ring atoms including one or more heteroatoms, advantageously 1 to 4 and even more advantageously 1 or 2, such as for example sulfur, nitrogen or oxygen atoms, the other ring atoms being carbon atoms. X and Y are integers between 5 and 36, preferably 5 and 18, in particular 5 and 10. Examples of heteroaryl groups are the furyl, thienyl, pyrrolyl, pyridinyl, pyrimidinyl, pyrazolyl, imidazolyl, triazolyl, tetrazolyl or indyl groups.

"($C_X$-$C_Y$)Alkylene group" means, in the sense of the present invention, a linear or branched, divalent hydrocarbon-containing chain, comprising X to Y carbon atoms, X and Y being integers between 1 and 36, preferably 1 and 18, in particular 1 and 6. As examples, mention may be made of the methylene, ethylene, propylene, butylene, pentylene or hexylene groups.

"($C_X$-$C_Y$) Cycloalkylene group" means, in the sense of the present invention, a saturated divalent cyclic hydrocarbon-containing group, comprising from X to Y ring carbon atoms, X and Y being integers between 3 and 36, preferably 3 and 18, in particular 3 and 6. As examples, mention may be made of the cyclopropylene, cyclohexylene or cyclopentylene groups.

"($C_X$-$C_Y$)Alkenylene group" means, in the sense of the present invention, a linear or branched, divalent hydrocarbon-containing chain, comprising X to Y carbon atoms and at least one double bond, X and Y being integers between 2 and 36, preferably 2 and 18, in particular 2 and 6. As examples, we may mention the vinylene (ethenylene) or propenylene groups.

"$(C_X-C_Y)$Cycloalkenylene group" means, in the sense of the present invention, a saturated divalent cyclic hydrocarbon-containing group, comprising from X to Y ring carbon atoms and at least one double bond, X and Y being integers between 3 and 36, preferably 3 and 18, in particular 3 and 6.

"$(C_X-C_Y)$Alkynylene group" means, in the sense of the present invention, a linear or branched, divalent hydrocarbon-containing chain, comprising X to Y carbon atoms and at least one triple bond, X and Y being integers between 2 and 36, preferably 2 and 18, in particular 2 and 6.

"$(C_X-C_Y)$Cycloalkynylene group" means, in the sense of the present invention, a saturated divalent cyclic hydrocarbon-containing group, comprising from X to Y ring carbon atoms and at least one triple bond, X and Y being integers between 3 and 36, preferably 3 and 18, in particular 3 and 6.

"$(C_X-C_Y)$Arylene" means, in the sense of the present invention, a divalent aromatic hydrocarbon-containing group, comprising from X to Y carbon atoms, and comprising one or more fused rings, X and Y being integers between 5 and 36, preferably 5 and 18, in particular 5 and 10. As examples, mention may be made of the phenylene group.

"$(C_X-C_Y)$Heteroarylene" means, in the sense of the present invention, a divalent aromatic group, comprising from X to Y ring atoms including one or more heteroatoms, advantageously 1 to 4 and even more advantageously 1 or 2, such as for example sulfur, nitrogen or oxygen atoms, the other ring atoms being carbon atoms. X and Y are integers between 5 and 36, preferably 5 and 18, in particular 5 and 10.

"Divalent radical" means, in the sense of the present invention, a radical having a valence of 2, i.e. having two covalent, polar covalent or ionic chemical bonds. Said radical may comprise for example carbon atoms and/or oxygen atoms.

"Dry extract" means, in the sense of the present invention, the mass of dry microspheres contained in 1 ml of water-swollen microspheres.

In the context of the present invention, "transfer agent" means a chemical compound possessing at least one weak chemical bond. This agent reacts with the radical site of a growing polymer chain and stops chain growth. In the chain transfer process, the radical is transferred temporarily to the transfer agent, which restarts growth by transferring the radical to another polymer or monomer.

Advantageously, said chain transfer agent is selected from the group consisting of the monofunctional or polyfunctional thiols and the alkyl halides.

The alkyl halides that may serve as transfer agent include in particular bromotrichloromethane, tetrachloromethane and tetrabromomethane.

Particularly advantageously, said chain transfer agent is a cycloaliphatic or aliphatic thiol typically having from 2 to about 24 carbon atoms, preferably 2 to 12 carbon atoms, more preferably 6 carbon atoms, and optionally having an additional functional group selected from the amino, hydroxy and carboxy groups.

Particularly preferred examples of chain transfer agents are thioglycolic acid, 2-mercaptoethanol, dodecanethiol, hexanethiol, and mixtures thereof, preferably hexanethiol.

In the context of the present invention, the transfer agent is in particular present in the reaction mixture in an amount from 1.5% to less than 6%, preferably from 1.5% to 4.5% and in particular 3% in moles relative to the number of moles of the hydrophilic monomer a). Thus, in the context of the present invention, the matrix is in particular based on a transfer agent in an amount from 1.5% to less than 6%, preferably from 1.5% to 4.5% and in particular 3% in moles relative to the number of moles of the hydrophilic monomer a).

In a preferred embodiment, the matrix of the nonbiodegradable embolization microspheres according to the invention is based on transfer agents in amounts from 1.5 to 4.5 mol % relative to the number of moles of hydrophilic monomer a).

Advantageously, the microspheres according to the invention comprise a crosslinked matrix based on 1.5% to 3% of transfer agent, preferably 3%.

Addition of a transfer agent to the reaction mixture in the aforementioned amounts, in particular between 1.5 and 3 mol % relative to the number of moles of hydrophilic monomer a), makes it possible in particular to avoid the presence of morphological defects on the microspheres of the invention after swelling and sterilization.

In the context of the present invention, absence of morphological defects is defined as the absence of double or twinned microspheres; of microspheres themselves contained in other microspheres (or bead-in-bead); of fractured microspheres or residues of fractured microspheres; of stacks or clusters of microspheres; of cracked microspheres; of deformed microspheres (of nonspherical shape); of microspheres with surfaces that are not smooth or of debris of polymers under magnification of up to 100 times; of inclusions in the microspheres; of drops of water trapped in the microspheres.

The embolization microspheres of the present invention advantageously have values of Young's modulus typically between 3000 Pa and 30 000 Pa, preferably between 3000 Pa and 25 000 Pa, more preferably between 3000 Pa and 10 000 Pa, preferably 5000 Pa to 10 000 Pa which are indicative of considerable resistance to compression of the microspheres, associated with an optimal degree of swelling and elasticity of said microspheres.

Advantageously, according to the invention, the nonbiodegradable embolization microspheres comprise a homogeneous crosslinked matrix.

"Homogeneous crosslinked matrix" means, in the sense of the present invention, a matrix consisting of a three-dimensional polymer network in which the components are uniformly distributed. This limits the presence of structural defects and reinforces the solidity of said network. In fact, typically, in the absence of a homogeneous crosslinked matrix, the polymer network will break at the level of its inhomogeneous zones under the action of a compressive force.

In the context of the present invention, a sphere is defined as a surface, all the points of which are at an equal distance from a point called the center.

"Microspheres" means, in the sense of the present invention, spherical particles having a diameter after swelling from 20 to 1200 µm, for example from 20 to 100 µm, 40 to 150 µm, from 100 to 300 µm, from 300 to 500 µm, from 500 to 700 µm, from 700 to 900 µm or from 900 to 1200 µm, as determined by optical microscopy. The microspheres advantageously have a diameter small enough to be injected using needles, catheters or microcatheters with an inside diameter ranging from some hundreds of micrometers to more than one millimeter.

The expression "after swelling" signifies that the size of the microspheres is considered after the steps of polymerization and sterilization that are involved during their preparation. The sterilization step involves for example passage of the microspheres after the polymerization step in an autoclave at high temperature, typically at a temperature above 100° C., preferably at a temperature between 110° C. and 150° C., preferably 121° C. During this sterilization step, the microspheres continue to swell. According to the present invention, the overall degree of swelling of the microspheres is controlled. The degree of swelling is defined as:

$$\text{degree of swelling by weight } (Q) = \frac{m_w(g) - m_d(g)}{m_d(g)}$$

where $m_w$ is the weight in grams of 1 mL of sedimented microspheres and $m_d$ is the weight in grams of 1 mL of sedimented microspheres which have then been lyophilized. "Controlled degree of swelling" means, in the sense of the present invention, that the degree of swelling is reproducible as a function of the batches, in particular that it differs by less than 15% from one batch to another.

"Sedimented microsphere" means, in the sense of the present invention, microspheres that are put into solution in a vessel and are then left for a sufficiently long time without stirring so that they sink to the bottom of the vessel in which they are contained, it thus being possible to remove the supernatant.

"Lyophilized microsphere" means, in the sense of the present invention, microspheres that have undergone freezing followed by dehydration by sublimation.

"Hydrophilic monomer" means, in the sense of the present invention, a monomer having strong affinity for water, i.e. tending to dissolve in water, to mix with water, to be wetted by water, or capable of swelling in water after polymerization.

The hydrophilic monomer a) of the present invention is selected from N-vinylpyrrolidone, and a monomer of the following formula (I):

(CH$_2$=CR$_1$)—CO-D     (I)

in which:
D represents O—Z or NH—Z, Z representing (C$_1$-C$_6$) alkyl, —(CR$_2$R$_3$)$_m$—CH$_3$, —(CH$_2$—CH$_2$—O)$_m$—H, —(CH$_2$—CH$_2$—O)$_m$—CH$_3$, —C(R$_4$OH)$_m$ or —(CH$_2$)$_m$—NR$_5$R$_6$ with m preferably representing an integer between 1 and 10, more preferably m is equal to 4 or 5.

Advantageously, the hydrophilic monomer a) according to the invention is selected from the group consisting of N-vinylpyrrolidone, vinyl alcohol, 2-hydroxyethylmethacrylate, sec-butyl acrylate, n-butyl acrylate, t-butyl acrylate, t-butyl methacrylate, methylmethacrylate, N-dimethylaminoethyl(methyl)acrylate, N,N-dimethylaminopropyl (meth)acrylate, t-butylaminoethyl(methyl)acrylate, N,N-diethylaminoacrylate, poly(ethylene oxide) (meth)acrylate, methoxy poly(ethylene oxide) (meth)acrylate, butoxy poly (ethylene oxide) (meth)acrylate, poly(ethylene glycol) (meth)acrylate, methoxy poly(ethylene glycol) (meth)acrylate, butoxy poly(ethylene glycol) (meth)acrylate, poly(ethylene glycol) methyl ether methacrylate (m-PEGMA), and mixtures thereof.

More advantageously, the hydrophilic monomer a) is poly(ethylene glycol) methyl ether methacrylate (m-PEGMA).

In the context of the present invention, the hydrophilic monomer a) is in particular present in the reaction mixture in an amount from 20% to 95%, preferably from 30% to 95%, more preferably from 45% to 95%, preferably from 45% to 75%, in particular from 45% to 70%, more particularly from 45% to 65% in moles relative to the total number of moles of monomers.

"Crosslinking monomer" means, in the sense of the present invention, a monomer, at least bifunctional but also multifunctional, possessing a double bond at each polymerizable end. The crosslinking monomer, in combination with the other monomers in the mixture, allows formation of a crosslinked network. The structure and the amount of crosslinking monomer(s) in the mixture of monomers can easily be selected by a person skilled in the art to supply the desired crosslink density. The crosslinking agent is also advantageous for the stability of the microspheres. The crosslinking agent prevents the microspheres being able to dissolve in any solvent whatsoever. The crosslinking agent also makes it possible to improve the compressibility of the microspheres, which is favorable for embolization.

"Nonbiodegradable hydrophilic crosslinking agent" means, in the sense of the present invention, a crosslinking agent as defined above, having strong affinity for water and that cannot be degraded in the physiological conditions of the body of a mammal, in particular the human body. In fact, biodegradation of a molecule is permitted when the latter contains sufficient functional sites that are cleavable in physiological conditions, in particular by the endogenous enzymes of the body of a mammal, in particular of the human body, and/or at physiological pH (generally around 7.4). The functional sites that are cleavable in physiological conditions are in particular amide bonds, ester bonds and acetals. A molecule comprising an insufficient number of said functional sites will therefore be regarded as nonbiodegradable. In the context of the present invention, the crosslinking monomer contains fewer than 20 functional sites that are cleavable in physiological conditions, preferably fewer than 15 sites, more preferably fewer than 10 sites, even more preferably fewer than 5 sites.

The nonbiodegradable, linear or branched hydrophilic crosslinking agent according to the invention is in particular a nonbiodegradable crosslinking agent that is soluble in an organic solvent and comprises the diacrylate, methacrylate, acrylamide, and/or methacrylamide polymerizable groups.

Advantageously, the crosslinking agent is of the following general formula (IIa) or (IIb):

(CH$_2$=CR$_7$)CO—NH-A-HN—OC(CR$_8$=CH$_2$)     (IIa), (CH$_2$=CR$_7$)CO—O-A-O—OC(CR$_8$=CH$_2$)     (IIb), in which
R$_7$ and R$_8$ represent, independently of one another, H or a (C$_1$-C$_6$)alkyl such as a methyl group, preferably R$_7$ and R$_8$ represent H; and
A preferably represents, alone or with at least one of the atoms to which it is bound, a (C$_1$-C$_6$)alkylene, a polyethylene glycol (PEG), a polysiloxane, a poly (dimethylsiloxane) (PDMS), a polyglycerol ester (PGE) or a bisphenol A.

Even more advantageously, A represents, alone or with at least one of the atoms to which it is bound, a (C$_1$-C$_6$) alkylene or a polyethylene glycol (PEG), preferably a polyethylene glycol (PEG).

In the context of the above definitions of A, the polyethylene glycol has a length in the range from 200 to 10 000 g/mol, preferably from 200 to 2000 g/mol, more preferably from 500 to 1000 g/mol.

As examples of crosslinking monomers usable in the context of the present invention, we may mention (without it being limiting): 1,4-butanediol diacrylate, pentaerythritol tetraacrylate, methylenebisacrylamide, glycerol 1,3-diglycerolate diacrylate and poly(ethylene glycol)dimethacrylate (PEGDMA).

Advantageously, the crosslinking monomer is poly(ethylene glycol)dimethacrylate (PEGDMA), the polyethylene glycol unit having a length in the range from 200 to 10 000 g/mol, preferably from 200 to 2000 g/mol, more preferably from 500 to 1000 g/mol.

In the context of the present invention, the crosslinking monomer is in particular present in the reaction mixture in an amount from 1% to 15%, preferably from 2% to 10%, in particular 2% to 7%, more particularly 2% to 5%, in particular 5 mol % relative to the total number of moles of monomers.

In a particular embodiment of the present invention, the crosslinked polymer matrix of the microspheres is based solely on the base constituents a), b) and c) as defined above, in the aforementioned proportions, no other base constituent being added to the reaction mixture. It is thus clear that the sum of the aforementioned proportions of monomers a) and b) must be equal to 100%.

According to a particular aspect of the invention, the crosslinked matrix of the microspheres according to the invention is moreover based on at least one ionized or ionizable monomer, of the following formula (III):

$(CH_2=CR_9)-M-E$ (III)

in which:
R$_9$ represents H or a (C$_1$-C$_6$) alkyl;
M represents a single bond or a divalent radical having from 1 to 20 carbon atoms, preferably a single bond;
E represents an ionized or ionizable group, E advantageously being selected from the group consisting of —COOH, —COO—, —SO$_3$H, —SO$_3$, —PO$_4$H$_2$, —PO$_4$H—, —PO$_{42}$—, —NR$_{10}$R$_{11}$, —NR$_{12}$R$_{13}$R$_{14}^+$, R$_{10}$, R$_{11}$, R$_{12}$, R$_{13}$ and R$_{14}$ represent, independently of one another, H or a (C$_1$-C$_6$)alkyl.

"Ionized or ionizable group" means, in the sense of the present invention, a group that is charged or that may be in a charged form (in the form of an ion), i.e. bearing at least one positive or negative charge, depending on the pH of the medium. For example, the COOH group may be ionized in the form COO$^-$ and the NH$_2$ group may be in the ionized form NH$_3^+$.

The introduction of an ionized or ionizable monomer in the reaction mixture makes it possible to increase the hydrophilicity of the resultant microspheres, thus increasing the degree of swelling of said microspheres, making them even easier to inject via catheters and microcatheters. The presence of an ionized or ionizable monomer facilitates in particular loading with active substances within the microsphere.

Preferably, the ionized or ionizable monomer is a cationic monomer, advantageously selected from the group consisting of (methacryloyloxy)ethylphosphorylcholine, 2-(dimethylamino)ethyl (meth)acrylate, 2-(diethylamino)ethyl (meth)acrylate and 2-((meth)acryloyloxy)ethyl)trimethylammonium chloride; advantageously, the cationic monomer is (diethylamino)ethyl (meth)acrylate. Advantageously, the crosslinked matrix of the microspheres according to the present invention may be obtained by adding, to the reaction mixture, between 1 and 40 mol % of an aforementioned cationic monomer, based on the total amount of monomers. Preferably, the crosslinked matrix according to the invention is obtained by adding, to the reaction mixture, between 5% and 15%, preferably by adding 10%, in moles of ionized or ionizable monomer relative to the total number of moles of monomers when the resultant microspheres are not intended to be loaded with an active substance. According to another embodiment, when the microspheres are intended to be loaded with an active substance, the crosslinked matrix according to the invention is obtained by adding to the reaction mixture between 20% and 40%, preferably by adding to the reaction mixture 20% to 30%, preferably 30 mol % of ionized or ionizable monomer relative to the total number of moles of monomers.

In another advantageous embodiment, the ionized or ionizable monomer is an anionic monomer advantageously selected from the group consisting of acrylic acid, methacrylic acid, 2-carboxyethyl acrylate, the 2-oligomers of carboxyethyl acrylate, 3-sulfopropyl (meth)acrylate, the potassium salt and the hydroxide of 2-((methacryloyloxy)ethyl)dimethyl-(3-sulfopropyl)ammonium. Advantageously, the crosslinked matrix of the nonbiodegradable embolization microspheres according to the present invention may be obtained by adding, to the reaction mixture, between 1 and 40 mol % of an aforementioned anionic monomer based on the total amount of monomers, more advantageously between 10 and 30 mol %.

Particularly advantageously, the ionized or ionizable monomer is methacrylic acid. Advantageously, the crosslinked matrix according to the invention is based on methacrylic acid (MA) in amounts between 10 and 30 mol % based on the total amount of monomers.

According to a preferred embodiment of the present invention, the crosslinked matrix of the microspheres according to the invention is moreover based on at least one halogenated monomer, preferably iodinated.

The introduction of a halogenated monomer, preferably iodinated, has the effect of increasing the density of the resultant microspheres. Surprisingly, the inventors discovered that when a halogenated monomer, typically iodinated, is used in the reaction mixture for obtaining the crosslinked matrix of the invention, in amounts advantageously between 1 and 15 mol % relative to the total number of monomers, the resultant embolization microspheres form an optimal, stable suspension in a mixture comprising 50% of normal saline solution and 50% of contrast agent. In other words, introduction of a halogenated monomer, in particular iodinated, in the aforementioned amounts makes it possible to prevent the microspheres floating to the surface of said mixture.

In the context of the present invention, the halogenated monomer is in particular added to the reaction mixture in an amount from 5% to 15%, preferably 5% to 10%, more particularly from 5% to 7%, in moles relative to the total number of moles of monomers.

Furthermore, using 15% or less of halogenated monomer in moles relative to the total number of moles of monomer, the resultant microspheres are not radiopaque. The halogenated monomer is introduced in an insufficient amount to endow the microsphere with radiopacity.

Advantageously, the halogenated monomer is of the following general formula (IV):

$(CH_2=CR_{15})-CO-Y$ (IV)

in which
Y represents O—W, (O—$R_{16}$)$_p$—W, (NH—$R_{16}$)$_p$—W or NH—W, W representing Ar, L-Ar, and p being an integer between 1 and 10, preferably between 1 and 4 in which:

Ar represents a ($C_5$-$C_{36}$) aryl or ($C_5$-$C_{36}$) heteroaryl group, said group being substituted with one, two or three atoms of iodine and/or of bromine, and optionally substituted with one to four, preferably two or three, groups selected from ($C_1$-$C_{10}$) alkyl, —$NR_aR_b$, —$NR_cCOR_d$, —$COOR_e$, —$OR_f$, —$OCOR_g$, —$CONR_hR_1$, —$OCONR_jR_k$, —$NR_lCOOR_c$, —$N_rCONR_sR_t$, —$OCOOR_u$, and —$COR_v$;

L represents —(CH$_2$)$_n$—, —(HCCH)$_n$—, —O—, —S—, —SO—, —SO$_2$—, —OSO$_2$—, —$NR_{17}$—, —CO—, —COO—, —OCO—, —OCOO—, —$CONR_{18}$—, —$NR_{19}CO$—, —$OCONR_{20}$—, —$NR_{21}COO$— or —$NR_{22}CONR_{23}$—, n being an integer from 1 to 10;

$R_{17}$ to $R_{23}$ and $R_a$ to $R_v$ represent, independently of one another, a hydrogen atom, a ($C_1$-$C_{10}$)alkyl, said ($C_1$-$C_{10}$) alkyl optionally being substituted with 1 to 10 OH groups, or a group —(CH$_2$—CH$_2$—O)$_q$—R', R' being a hydrogen atom or a —($C_1$-$C_6$)alkyl and q being an integer between 1 and 10, preferably between 1 and 5;

$R_{15}$ represents H or a ($C_1$-$C_6$) alkyl;

$R_{16}$ represents a group selected from ($C_1$-$C_{36}$) alkylene, ($C_3$-$C_{36}$) cycloalkylene, ($C_2$-$C_{36}$) alkenylene, ($C_3$-$C_{36}$) cycloalkenylene, ($C_2$-$C_{36}$) alkynylene, ($C_3$-$C_{36}$) cycloalkynylene, ($C_5$-$C_{36}$) arylene and ($C_5$-$C_{36}$) heteroarylene.

In the context of the present invention, the halogenated monomer is more advantageously a monomer of general formula (IV) as defined above, in which Y represents NH—W, O—W or (O—$R_{16}$)$_p$—W, advantageously NH—W or (O—$R_{16}$)$_p$—W, more advantageously (O—$R_{16}$)$_p$—W, W representing Ar or L-Ar, p, $R_{16}$, L and Ar being as defined above. Preferably, $R_{16}$ is a ($C_1$-$C_{36}$)alkylene, in particular a ($C_1$-$C_{18}$) alkylene, more particularly a ($C_1$-$C_6$) alkylene; L represents —OCO—; and Ar represents a ($C_5$-$C_{36}$)aryl, in particular a ($C_5$-$C_{10}$)aryl, more particularly a phenyl, substituted with one, two or three atoms of iodine and/or of bromine, preferably of iodine, and optionally two or three groups selected from —$NR_aR_b$, —$NR_cCOR_d$, —$COOR_e$, —$OCOR_g$, —$CONR_hR_1$, —$OCONR_jR_k$, —$NR_1COOR_c$— and —$N_rCONR_sR_t$, preferably —$NR_aR_b$, —$NR_cCOR_d$.

Advantageously, the halogenated monomer is a monomer of general formula (IV) as defined above, in which Y represents NH—W or (O—$R_{16}$)$_p$—W, more advantageously (O—$R_{16}$)$_p$—W, W representing Ar or L-Ar, and p, $R_{16}$, L and Ar being as defined above. Preferably, $R_{16}$ is a ($C_2$-$C_{36}$) alkylene, in particular a ($C_2$-$C_{18}$) alkylene, more particularly a ($C_2$-$C_6$)alkylene; L represents —OCO—, —C(O)$NR_{17}$—, or —$NR_{18}$C(O)—; and Ar represents a ($C_5$-$C_{36}$)aryl, in particular a ($C_5$-$C_{10}$)aryl, more particularly a phenyl, substituted with one, two or three atoms of iodine and/or of bromine, preferably of iodine, and optionally two or three groups selected from —$NR_aR_b$, —$NR_cCOR_d$, —$COOR_e$, —$OCOR_g$, —$CONR_hR_1$, —$OCONR_jR_k$, —$NR_1COOR_c$— and —$N_rCONR_sR_t$, preferably —$NR_aR_b$, —$NR_cCOR_d$ and —C(O)$NR_hR_1$.

Advantageously, Ar represents a ($C_5$-$C_{10}$)aryl, more particularly a phenyl, substituted with three atoms of iodine and/or of bromine, preferably of iodine, and optionally two groups selected from ($C_1$-$C_{10}$) alkyl, —$NR_aR_b$, —$NR_cCOR_d$, —$COOR_e$, —$OCOR_g$, —$CONR_hR_1$, —$OCONR_jR_k$, —$NR_1COOR_a$— and —$N_rCONR_sR_t$.

Advantageously, Ar represents a phenyl substituted with three atoms of iodine and/or of bromine, preferably of iodine, and optionally two groups selected from ($C_1$-$C_{10}$) alkyl, —$NR_aR_b$, —$NR_cCOR_d$, —$COOR_e$, —$OCOR_g$, —$CONR_hR_1$, —$OCONR_jR_k$, —$NR_1COOR_c$— and —$N_rCONR_sR_t$, advantageously from ($C_1$-$C_{10}$) alkyl, —$NR_aR_b$, —$NR_cCOR_d$, —$COOR_e$, —$CONR_hR_1$, —$NR_lCOOR_o$— and —$N_rCONR_sR_t$.

Advantageously, the halogenated monomer is a monomer of general formula (IV) as defined above, in which Y represents O—$C_6H_4I$, O—$C_6H_3I_2$, O—$C_6H_2I_3$, NH—$C_6H_4I$, NH—$C_6H_3I_2$, NH—$C_6H_2I_3$, O—CH$_2$—CH$_2$—C(O)—$C_6H_4I$, O—CH$_2$—CH$_2$—O—C(O)—$C_6H_3I_2$, O—CH$_2$—CH$_2$—O—C(O)—$C_6H_2I_3$, NH—CH$_2$—CH$_2$—C(O)—$C_6H_4I$, NH—CH$_2$—CH$_2$—O—C(O)—$C_6H_3I_2$, or NH—CH$_2$—CH$_2$—O—C(O)—$C_6H_2I_3$, in particular O—$C_6H_2I_3$, NH—$C_6H_2I_3$, O—CH$_2$—CH$_2$—O—C(O)—$C_6H_2I_3$, or NH—CH$_2$—CH$_2$—O—C(O)—$C_6H_2I_3$.

In another embodiment, the halogenated monomer is of the following general formula (VI):

$$(CH_2=CR_{29})-CO-Y' \qquad (VI)$$

in which $R_{29}$ represents H or a ($C_1$-$C_6$) alkyl;

Y' represents (O—$R_{30}$)$_t$—W'—Ar', or NH—W'—Ar', t being an integer between 1 and 10, preferably between 1 and 4;

$R_{30}$ represents a group selected from ($C_2$-$C_{36}$) alkylene;

W' represents a single bond, —$CONR_{31}$—, or —$NR_{32}CO$—;

Ar' represents a ($C_5$-$C_{36}$)aryl group, said group being substituted with one, two or three atoms of iodine and/or of bromine, and optionally substituted with one to four, preferably two or three, groups selected from ($C_1$-$C_{10}$) alkyl, —$NR_{33}R_{34}$, —$NR_{35}COR_{36}$, —$COOR_{37}$, —$OR_{38}$, —$OCOR_{39}$, —$CONR_{40}R_{41}$, —$OCONR_{42}R_{43}$, —$NR_{44}COOR_{45}$, $NR_{46}CONR_{47}R_{48}$, —$OCOOR_{49}$, and —$COR_{50}$;

$R_{31}$ and $R_{32}$ represent, independently of one another, a hydrogen atom or a ($C_1$-$C_6$)alkyl;

$R_{33}$ to $R_{50}$ represent, independently of one another, a hydrogen atom, a ($C_1$-$C_{10}$) alkyl, said ($C_1$-$C_{10}$) alkyl optionally being substituted with 1 to 10 OH groups, or a group —(CH$_2$—CH$_2$—O)$_t$—R''', R''' being a hydrogen atom or a —($C_1$-$C_6$)alkyl and t' being an integer between 1 and 10, preferably between 1 and 5.

Advantageously, $R_{29}$ represents a ($C_1$-$C_6$)alkyl, more advantageously a ($C_1$-$C_3$)alkyl, more advantageously a methyl.

Advantageously, $R_{30}$ represents a ($C_2$-$C_{18}$) alkylene, more particularly a ($C_2$-$C_6$) alkylene, more advantageously an ethylene.

Advantageously, $R_{31}$ and $R_{32}$ represent, independently of one another, a hydrogen atom. Thus, W' advantageously represents a single bond, —C(O)NH—, or —NHC(O)—.

Advantageously, Ar' represents a ($C_5$-$C_{10}$)aryl, more particularly a phenyl, substituted with one, two or three atoms of iodine and/or of bromine, preferably of iodine, and optionally two or three groups selected from ($C_1$-$C_{10}$) alkyl, —$NR_{33}R_{34}$, —$NR_{35}C(O)R_{36}$, —C(O)$OR_{37}$, —$OR_{38}$, —OC(O)$R_{39}$, —C(O)$NR_{40}R_{41}$, —OC(O)$NR_{42}R_{43}$, —$NR_{44}C(O)OR_{45}$, —$NR_{46}C(O)NR_{47}R_{48}$, —OC(O)$OR_{49}$, and —C(O)$R_{50}$.

Advantageously, Ar' represents a ($C_5$-$C_{10}$)aryl, more particularly a phenyl, substituted with three atoms of iodine and/or of bromine, preferably of iodine, and optionally two groups selected from ($C_1$-$C_{10}$) alkyl, —$NR_{33}R_{34}$, —$NR_{35}$C (O)R$_{36}$, —C(O)OR$_{37}$, —OR$_{38}$, —OC(O)R$_{39}$, —C(O)NR$_{40}$R$_{41}$, —OC(O)NR$_{42}$R$_{43}$, —NR$_{44}$C(O)OR$_{45}$, —NR$_{46}$C(O)NR$_{47}$R$_{48}$, —OC(O)OR$_{49}$, and —C(O)R$_{50}$.

Advantageously, Ar' represents a phenyl substituted with three atoms of iodine and/or of bromine, preferably of iodine, and optionally two groups selected from (C$_1$-C$_{10}$) alkyl, —NR$_{33}$R$_{34}$, —NR$_{35}$C(O)R$_{36}$, —C(O)OR$_{37}$, —OR$_{38}$, —OC(O)R$_{39}$, —C(O)NR$_{40}$R$_{41}$, —OC(O)NR$_{42}$R$_{43}$, —NR$_{44}$C(O)OR$_{45}$, —NR$_{46}$C(O)NR$_{47}$R$_{48}$, —OC(O)OR$_{49}$, and —C(O)R$_{50}$, advantageously from (C$_1$-C$_{10}$) alkyl, —NR$_{33}$R$_{34}$, —NR$_{35}$C(O)R$_{36}$, —C(O)OR$_{37}$, —OR$_{38}$, —C(O)NR$_{40}$R$_{41}$, —NR$_{44}$C(O)OR$_{45}$, —NR$_{46}$C(O)NR$_{47}$R$_{48}$, —OC(O)OR$_{49}$, and —C(O)R$_{50}$.

Advantageously, the halogenated monomer is selected from the compounds of the following general formula (VI):

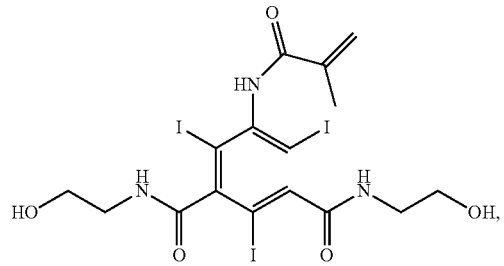

(VIa)

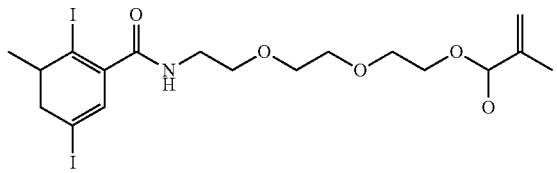

(VIb)

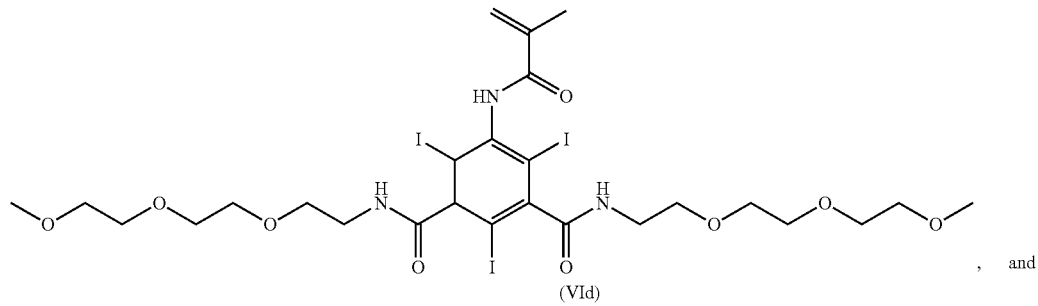

(VIc)

, and

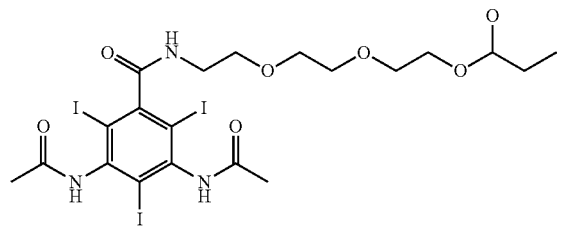

(VId)

Advantageously, the halogenated monomer is selected from the following compounds:

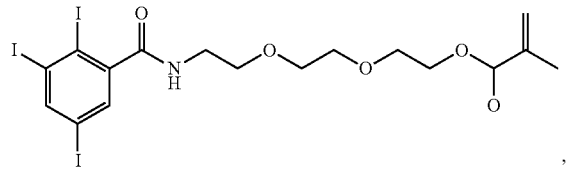

(VIb)

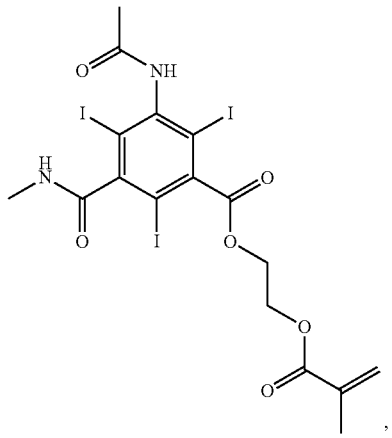

(IVb)

More advantageously, the halogenated monomer is selected from (triiodobenzoyl)oxoethyl methacrylate (MAOETIB) of the following formula (IVa):

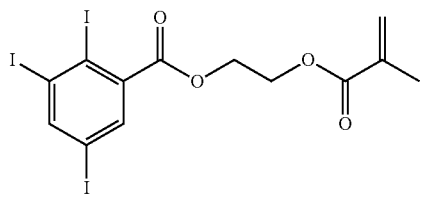
(IVa)

or 2-(2-(2-(2,3,5-triiodobenzamido)ethoxy)ethoxy)ethyl methacrylate of the following formula:

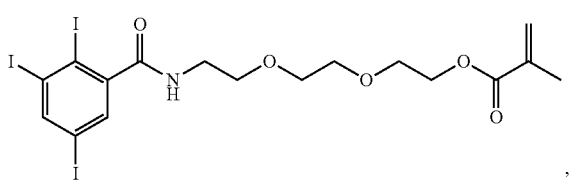
(VIb)

In the context of the present invention, the crosslinked matrix of the microspheres according to the invention is moreover based on at least one colored monomer for making them visible to the naked eye. This makes it possible in particular to verify before injection that the suspension of microspheres is properly homogeneous in the syringe and to monitor the rate of injection.

Thus, according to a particular embodiment, the crosslinked matrix of the microspheres according to the invention is moreover based on at least one colored monomer of the following general formula (V):

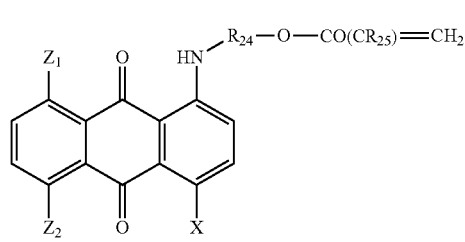
(V)

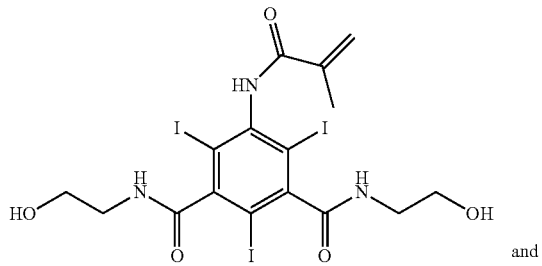
(VIa)

and

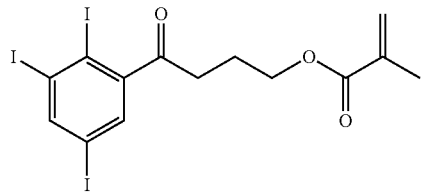
(IVa)

in which, $Z_1$ and $Z_2$ represent, independently of one another, H or $OR_{26}$, $R_{26}$ representing H or a ($C_1$-$C_6$) alkyl, advantageously $Z_1$ and $Z_2$ represent H;

X represents H or a halogen such as Cl, advantageously H;

$R_{24}$ represents a group selected from linear or branched ($C_1$-$C_6$) alkylene, ($C_5$-$C_{36}$) arylene, ($C_5$-$C_{18}$) arylene-O—$R_{27}$, ($C_5$-$C_{18}$) heteroarylene and ($C_5$-$C_{18}$)heteroarylene-O—$R_{28}$, $R_{27}$ and $R_{28}$ representing a ($C_1$-$C_6$) alkyl or a ($C_1$-$C_6$) alkylene, advantageously $R_{24}$ represents a group —$C_6H_4$—O—$(CH_2)_2$— or —$C(CH_3)_2$—$CH_2$—.

$R_{25}$ represents H or a ($C_1$-$C_6$) alkyl, advantageously a ($C_1$-$C_6$)alkyl, in particular a methyl.

Advantageously, the colored monomer is of the following formula (Va) or (Vb):

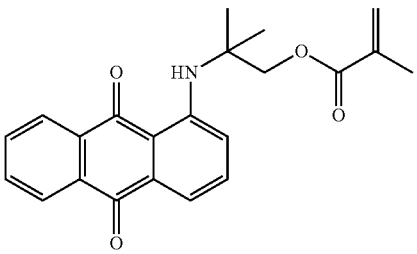
(Va)

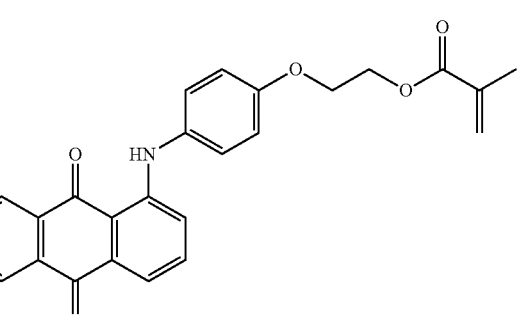
(Vb)

In the context of the present invention, the colored monomer is in particular added to the reaction mixture in an amount from 0% to 1%, preferably from 0% to 0.5%, more particularly from 0.01% to 0.2%, more preferably from 0.02% to 0.2%, and even more particularly from 0.04% to 0.1% in moles relative to the total number of moles of monomers.

Magnetic resonance imaging (MRI) is used in the medical setting for supplying two-dimensional sectional images of the internal structures of a patient's body without exposing them to harmful radiation. The crosslinked matrix of the embolization microspheres according to the invention may moreover be based on particles for making the microspheres visible on the scans from magnetic resonance imaging.

Thus, advantageously, the crosslinked matrix of the microspheres according to the invention is moreover based on agents that are visible in magnetic resonance imaging (MRI) such as nanoparticles of iron oxide, gadolinium chelates or magnesium chelates, advantageously nanoparticles of iron oxide such as USPIOs (Ultra Small Super Paramagnetic Iron Oxide or Ultra Small Paramagnetic Iron Oxides=magnetic particles based on an iron compound, which display superparamagnetic properties that make them visible in MRI).

In the context of the present invention, the particles that are visible in MRI are advantageously added to the reaction mixture in an amount from 0% to 10%, preferably from 0.1% to 10% by volume of organic phase.

In the context of the present invention, when the crosslinked matrix of the microspheres does not comprise an ionized or ionizable monomer as a base constituent, it is advantageously based on:
- 94.5% to 98% of hydrophilic monomer a), preferably 94.5% to 96%, preferably 94.96%;
- 2% to 5% of nonbiodegradable hydrophilic crosslinking monomer b), preferably 3% to 5%, preferably 5%;
- 1% to 3% of transfer agent c), preferably 3%;
- 0% to 0.5% of colored monomer, preferably 0.02% to 0.1%, preferably 0.04%; and
- 0% to 10% of particles visible in MRI, preferably 0% to 5%, preferably 1%, each of the aforementioned monomers and the nature of their associated percentages being as defined above in the present description. It is clear that the sum of the aforementioned percentages of monomer must be equal to 100%.

According to another embodiment of the present invention, the microspheres according to the invention that are not loaded with an active substance comprise a crosslinked matrix advantageously based on:
- 79.5% to 93% of hydrophilic monomer a), preferably 80% to 90%, preferably 84.96%;
- 2% to 5% of nonbiodegradable hydrophilic crosslinking monomer b), preferably 3% to 5%, preferably 5%;
- 1% to 3% of transfer agent c), preferably 3%;
- 5% to 15% of ionized or ionizable monomer, preferably 8% to 12%, preferably 10%;
- 0% to 0.5% of colored monomer, preferably 0.02% to 0.1%, preferably 0.04%; and
- 0% to 10% of particles visible in MRI, preferably 0% to 5%, preferably 1%, each of the aforementioned monomers and the nature of their associated percentages being as defined above in the present description. It is clear that the sum of the aforementioned percentages of monomers must be equal to 100%.

According to a preferred embodiment of the present invention, the microspheres according to the invention that are not loaded with an active substance comprise a crosslinked matrix advantageously based on:
- 63% to 95% of hydrophilic monomer a), preferably 70% to 90%, preferably 75% to 80%, preferably 79.96%;
- 2% to 5% of nonbiodegradable hydrophilic crosslinking monomer b), preferably 3% to 5%, preferably 5%;
- 1% to 3% of transfer agent c), preferably 3%;
- 5% to 15% of ionized or ionizable monomer, preferably 8% to 12%, preferably 10%;
- 5% to 7% of halogenated monomer, preferably 5% to 6%, preferably 5%;
- 0% to 0.5% of colored monomer, preferably 0.02% to 0.1%, preferably 0.04%; and
- 0% to 10% of particles visible in MRI, preferably 0% to 5%, preferably 1%, each of the aforementioned monomers and the nature of their associated percentages being as defined above in the present description. It is clear that the sum of the aforementioned percentages of monomer must be equal to 100%.

In the context of the present invention, the microspheres according to the invention that are loaded with an active substance comprise a crosslinked matrix advantageously based on:
- 45% to 65% of hydrophilic monomer a), preferably 50% to 65%, preferably 55% to 65%, preferably 64.96%;
- 2% to 5% of nonbiodegradable hydrophilic crosslinking agent b), preferably 3% to 5%, preferably 5%;
- 1% to 3% of transfer agent c), preferably 3%;
- 20% to 40% of ionized or ionizable charged monomer, preferably 30% to 40%, preferably 30%;
- 0% to 0.5% of colored monomer, preferably 0.02% to 0.1%, preferably 0.04%; and
- 0% to 10% of particles visible in MRI, preferably 0% to 5%, preferably 1%, each of the aforementioned monomers and the nature of their associated percentages being as defined above in the present description. It is clear that the sum of the aforementioned percentages of monomer must be equal to 100%.

Preferably, the microspheres according to the invention that are loaded with an active substance comprise a crosslinked matrix advantageously based on:
- 47.5% to 73% of hydrophilic monomer a), preferably 50% to 70%, preferably 59.96%;
- 2% to 5% of nonbiodegradable hydrophilic crosslinking agent b), preferably 3% to 5%, preferably 5%;
- 1% to 3% of transfer agent c), preferably 3%;
- 20% to 40% of ionized or ionizable charged monomer, preferably 30% to 40%, preferably 30%;
- 5% to 7% of halogenated monomer, preferably 5% to 6%, preferably 5%;
- 0% to 0.5% of colored monomer, preferably 0.02% to 0.1%, preferably 0.04%; and
- 0% to 10% of particles visible in MRI, preferably 0% to 5%, preferably 1%, each of the aforementioned monomers and the nature of their associated percentages being as defined above in the present description.

The crosslinked matrix of the microspheres according to the invention can easily be synthesized by many methods that are familiar to a person skilled in the art. As an example, the crosslinked matrix according to the invention may typically be obtained by direct or inverse suspension polymerization, as described below and in the examples.

Direct suspension may take place as follows:
(a) mix or stir a reaction mixture comprising:
  (i) at least one hydrophilic monomer a) as defined above, at least one nonbiodegradable hydrophilic crosslinking agent b) as defined above, and at least one transfer agent c) as defined above;
  (ii) a polymerization initiator present in amounts in the range from 0.1 to about 2 parts by weight per 100 parts by weight of monomers;
  (iii) a surfactant in an amount not greater than about 5 parts by weight per 100 parts by weight of aqueous phase, preferably not greater than about 3 parts by weight and most preferably in the range from 0.2 to 1.5 parts by weight of aqueous phase; and (iv) water to form an oil-in-water suspension; and (b) polymerize the base constituents.

In this direct suspension process, the surfactant may be selected from the group consisting of hydroxyethyl cellulose, polyvinyl alcohol (PVA), polyvinylpyrrolidone, polyethylene oxide, polyethylene glycol and Polysorbate 20 (Tween® 20); preferably it is PVA.

The microspheres thus obtained are then washed and calibrated by techniques that are familiar to a person skilled in the art.

Inverse suspension may be carried out as follows:

(a) mix or stir a reaction mixture comprising:
  (i) at least one hydrophilic monomer a) as defined above, at least one nonbiodegradable hydrophilic crosslinking agent b) as defined above, and at least one transfer agent c) as defined above;
  (ii) a polymerization initiator present in amounts in the range from 0.1 to about 2 parts by weight per 100 parts by weight of monomers;
  (iii) a surfactant in an amount not greater than about 10 parts by weight per 100 parts by weight of the oily phase, preferably not greater than about 8 parts by weight and most preferably in the range from 3 to 7 parts by weight; and
  (iv) oil to form a water-in-oil suspension;

and (b) polymerize the base constituents.

In the aforementioned methods, the polymerization initiator may in particular be t-butyl peroxide, benzoyl peroxide, azobiscyanovaleric acid (also called 4,4'-azobis(4-cyanopentanoic) acid, 1,1'-azobis(cyclohexane carbonitrile) or AIBN (azobisisobutyronitrile) or one or more thermal initiators such as 2-hydroxy-4'-(2-hydroxyethoxy)-2-methylpropiophenone (106797-53-9); 2-hydroxy-2-methylpropiophenone (Darocur® 1173, 7473-98-5), 2,2-dimethoxy-2-phenylacetophenone (24650-42-8), 2,2-dimethoxy-2-phenylacetophenone (Irgacure®, 24650-42-8) or 2-methyl-4'-(methylthio)-2-morpholinopropiophenone (Irgacure®, 71868-10-5).

In this inverse suspension process, the surfactant may be selected from the group consisting of sorbitan esters such as sorbitan monolaurate (Span® 20), sorbitan monopalmitate (Span® 40), sorbitan monooleate (Span® 80) and sorbitan trioleate (Span® 85), hydroxyethyl cellulose, mixture of glyceryl stearate and PEG stearate (Arlacel®) and cellulose acetate.

The oil used in the method described above may be selected from paraffin oil, silicone oil and the organic solvents such as hexane, cyclohexane, ethyl acetate or butyl acetate.

When the crosslinked matrix according to the invention is obtained by polymerization of at least one ionized or ionizable monomer, a drug, an active substance, a diagnostic agent or macromolecules may also be loaded on the microspheres, i.e. adsorbed on the crosslinked matrix by noncovalent interactions, optionally in the presence of pharmaceutically acceptable excipient(s) familiar to a person skilled in the art.

This particular way of trapping drugs or active substances is called physical encapsulation. No particular requirement is imposed on the drug or active substance to be loaded.

Loading may be done by many methods that are familiar to a person skilled in the art, such as passive adsorption (swelling of the crosslinked matrix in a drug solution) or by ionic interaction. These methods are described for example in international application WO 2012/120138, in particular from page 22 line 20 to page 26 line 7. The efficiency of encapsulation depends mainly on the compatibility between the two structures and/or favorable interactions.

In the context of the present invention, the microspheres may be loaded with a drug, an active substance or a diagnostic agent and thus allow their release at a target site, said target site being inside the body of a mammal, in particular inside a human body.

The crosslinked matrix of the microspheres according to the invention may therefore be loaded with a drug or an active substance or a diagnostic agent, advantageously having a molecular weight below 5000 Da, typically below 1000 Da, the drug or the active substance advantageously being selected from the group consisting of anti-inflammatory agents, local anesthetics, analgesics, antibiotics, anticancer agents, steroids, antiseptics and a mixture thereof.

Preferably, the polymer according to the invention may be loaded with an anticancer agent.

The anticancer agent is preferably selected from anthracyclines such as doxorubicin, epirubicin or idarubicin, platinum complexes, compounds related to anthracyclines such as mitoxantrone and nemorubicin, antibiotics such as mitomycin C (Ametycine®), bleomycin and actinomycin D, other antineoplastic compounds such as irinotecan, 5-fluorouracil (Adrucil®), sorafenib (Nevaxar®), sunitinib (Sutent®), regorafenib, brivanib, orantinib, linsitinib, erlotinib, cabozantinib, foretinib, tivantinib, fotemustine, tauromustine (TCNU), carmustine, cytosine C, cyclophosphonamide, cytosine arabinoside (or cytarabine), paclitaxel, docetaxel, methotrexate, everolimus (Afinitor®), PEG-arginine deiminase, the tegafur/gimeracil/oteracil combination (Teysuno®), muparfostat, peretinoin, gemcitabine, bevacizumab (Avastin®), ramucirumab, floxuridine, immunostimulants such as GM-CSF (granulocyte-macrophage colony-stimulating factor) and recombinant forms thereof: molgramostim or sargramostim (Leukin®), OK-432 (Picibanil®), interleukin-2, interleukin-4 and tumor necrosis factor-alpha (TNFalpha), antibodies, radioelements, complexes of these radioelements with chelates, nucleic acid sequences and a mixture of one or more of these compounds (preferably a mixture of one or more anthracyclines).

Preferably, the anticancer agent is selected from anthracyclines, immunostimulants, platinum complexes, antineoplastics and mixtures thereof.

Even more preferably, the anticancer agent is selected from anthracyclines, antibodies, antineoplastics and mixtures thereof.

The antibodies are for example selected from the anti-PD-1, the anti-PD-L1, the anti-CTLA-4, the anti-CEA (CarcinoEmbryonic Antigen) or a mixture thereof.

The anti-PD-1 are for example nivolumab or pembrolizumab.

The anti-PD-L1 are for example avelumab, durvalumab or atezolizumab.

The antiCTLA-4 are for example ipilimumab or tremelimumab.

Even more advantageously, the anticancer drug is selected from the group consisting of paclitaxel, doxorubicin, epirubicin, idarubicin, irinotecan, GM-CSF (granulocyte-macrophage colony-stimulating factor), tumor necrosis factor-alpha (TNFalpha), antibodies, and mixtures thereof.

Preferably, the local anesthetic is selected from lidocaine, bupivacaine and mixtures thereof.

The anti-inflammatory may be selected from ibuprofen, niflumic acid, dexamethasone, naproxen and mixtures thereof.

In the context of the present invention, the polymer may be loaded, in particular by extemporaneous adsorption, with macromolecules selected from the group consisting of enzymes, antibodies, cytokines, growth factors, clotting factors, hormones, plasmids, antisense oligonucleotides, siRNA, ribozymes, DNA enzyme (also called DNAzyme), aptamers, anti-inflammatory proteins, bone morphogenetic proteins (BMP), pro-angiogenic factors, vascular endothelial growth factors (VEGF) and TGF-beta, and angiogenesis inhibitors or antityrosine kinases and mixtures thereof.

The anti-inflammatory proteins are for example infliximab or rilonacept and a mixture thereof.

The pro-angiogenic factors are for example fibroblast growth factors (FGF) and a mixture thereof.

The angiogenesis inhibitors are for example bevacizumab, ramucirumab, nesvacumab, olaratumab, vanucizumab, rilotumumab, emibetuzumab, aflibercept, ficlatuzumab, pegaptanib and mixtures thereof.

The antityrosine kinases are for example lenvatinib, sorafenib, sunitinib, pazopanib, vandetanib, axitinib, regorafenib, cabozantinib, fruquintinib, nintedanib, anlotinib, motesanib, cediranib, sulfatinib, dovetinib, linifanib and mixtures thereof.

Advantageously, the polymer may be loaded with macromolecules selected from antityrosine kinases, TGF-beta, angiogenesis inhibitors and mixtures thereof.

In a second aspect, the invention relates to a pharmaceutical composition comprising nonbiodegradable embolization microspheres according to the invention, in association with a pharmaceutically acceptable vehicle, advantageously for administration by injection.

Examples of pharmaceutically acceptable vehicles comprise, but are not limited to, water for injection, saline solution also called normal saline solution, starch, hydrogel, polyvinylpyrrolidone, polysaccharide, ester of hyaluronic acid, plasma, a contrast agent for imaging by X-ray, by magnetic resonance or by ultrasonography, a buffering agent, a preservative, a gelling agent and/or a surfactant. Advantageously, the pharmaceutically acceptable vehicle is normal saline solution, water for injection, a contrast agent for imaging by X-ray, by magnetic resonance or by ultrasonography, or mixtures thereof. More advantageously, the pharmaceutically acceptable vehicle is normal saline solution, a contrast agent for imaging by X-ray, by magnetic resonance or by ultrasonography, or a mixture of normal saline solution and a contrast agent for imaging by X-ray, by magnetic resonance or by ultrasonography.

According to the present invention, the contrast agent is preferably a contrast agent for imaging by X-ray. Advantageously it is a nonionic iodinated water-soluble contrast agent, such as for example iobitridol (Xenetix®), iopamidol (Iopamiron®, Isovue®), iomeprol (Iomeron®), ioversol (Optiray®, Optiject®), iohexol (Omnipaque®), iopentol (Imagopaque®), ioxitol (Oxilan®), iopromide (Ultravist®), metrizamide (Amipaque®), iosarcol (Melitrast®), iotrolan (Isovist®), iodixanol (Visipaque®), iosimenol and iosimide (Univist®) and a mixture thereof.

According to another embodiment, the contrast agent is a contrast agent for magnetic resonance imaging (MRI) Advantageously it is gadolinium chelates (Dotarem®).

According to another embodiment, the contrast agent is a contrast agent for imaging by ultrasonography. Advantageously it is sulfur hexafluoride (Sonovue®).

In a particular embodiment of the present invention, the pharmaceutical composition comprises nonbiodegradable embolization microspheres according to the invention, in association with normal saline solution, said composition being intended to be mixed with at least one contrast agent for imaging by X-ray, by magnetic resonance or by ultrasonography as defined above, in particular for imaging by X-ray, before administration by injection, said mixing involving preparing a suspension of the microspheres according to the invention.

The pharmaceutical composition advantageously has an acceptable viscosity for injection.

In a particular embodiment according to the invention, the pharmaceutical composition according to the invention comprises nonbiodegradable embolization microspheres according to the invention, in association with a mixture of normal saline solution and a contrast agent as defined above, the normal saline solution and the contrast agent being present in proportions from 70/30 to 20/80, advantageously from 50/50 to 20/80, preferably 50/50.

Advantageously, when the pharmaceutical composition according to the invention comprises microspheres obtained by polymerization of a reaction mixture comprising from 5% to 10%, more preferably from 5% to 7% of halogenated monomer as described in the present description, said pharmaceutical composition comprises said microspheres in association with a mixture of normal saline solution and a contrast agent in proportions between 80/20 and 0/100, preferably 70/30 and 40/60, in particular 50/50. Preferably said microspheres have a size of 500 to 700 µm, 700 to 900 µm or 900 to 1200 µm. In this way, the suspension of microspheres in the solution is homogeneous and stable for the required time for injection.

In another embodiment according to the invention, when the pharmaceutical composition according to the invention comprises microspheres obtained by polymerization of a reaction mixture not comprising a halogenated monomer as described in the present description, said pharmaceutical composition comprises said microspheres in association with a mixture of normal saline solution and a contrast agent in proportions between 80/20 and 0/100.

The fields of application of the nonbiodegradable embolization microspheres according to the invention comprise in particular vascular embolization in particular in the case of uterine fibroma and chemoembolization, for example in the case of hepatocarcinoma also called hepatocellular carcinoma (HCC) or primary liver cancer, which consists of eliminating a tumor by combining vascular occlusion with the delivery of one or more active substances or macromolecules loaded in embolization microspheres. This technique makes it possible to concentrate the drug load at the level of the tumor and therefore reduce the systemic concentration and at the same time any undesirable effects.

The nonbiodegradable embolization microspheres according to the invention may, as was mentioned above, be used for various biomedical purposes, which means that they must be compatible with the human body or with the body of a mammal. More particularly, suitable biomedical materials do not have hemolytic properties.

The present invention further relates to the specific use of a transfer agent in the polymerization of a crosslinked matrix contained in nonbiodegradable embolization microspheres to allow injection of said microspheres, in particular injection in a catheter or a microcatheter with an inside diameter in the range from some hundreds of micrometers to more than one millimeter.

The present invention also relates to the specific use of a transfer agent in the polymerization of a crosslinked matrix to improve the mechanical properties (swelling, elasticity, solidity, resistance to compression). Said transfer agent is in particular selected from cycloaliphatic or aliphatic thiols having in particular from 2 to 24 carbon atoms, and optionally having another functional group selected from the amino, hydroxy and carboxy groups.

The present invention also relates to a kit comprising a pharmaceutical composition as defined above and at least one means of injection of said composition, for parenteral administration of said composition. According to the present invention, "means of injection" means any means allowing parenteral administration.

Advantageously, said means of injection is one or more syringes and/or one or more syringes that may be prefilled and/or one or more catheters or microcatheters for administration of said composition by injection.

Advantageously, the pharmaceutical composition present in said kit comprises the microspheres according to the present invention in association with normal saline solution, a contrast agent, or a mixture thereof.

More advantageously, said pharmaceutical composition comprises the microspheres according to the present invention in association with a mixture of normal saline solution and a contrast agent in proportions between 80/20 and 0/100, advantageously between 70/30 and 40/60, preferably 50/50.

Advantageously, when the microspheres according to the invention are obtained by polymerization of a reaction mixture comprising from 5% to 10%, more preferably from 5% to 7% of halogenated monomer as described in the present description, said pharmaceutical composition comprises said microspheres in association with a mixture of normal saline solution and a contrast agent in proportions between 60/40 and 0/100, advantageously 50/50.

According to another embodiment of the present invention, when the microspheres according to the invention are obtained by polymerization of a reaction mixture not comprising a halogenated monomer as described in the present description, said pharmaceutical composition comprises said microspheres in association with a mixture of normal saline solution and a contrast agent in proportions between 80/20 and 0/100.

Advantageously, the means of injection present in the kit according to the invention is suitable for parenteral administration of the pharmaceutical composition according to the invention. Thus, the size of the syringe(s) or of the (micro)catheter(s) will be adapted as a function of the size of the microspheres according to the invention and the volume to be injected for embolization. A person skilled in the art will be able to select suitable means of injection.

The present invention also relates to a kit comprising on the one hand a pharmaceutical composition as defined above and on the other hand at least one contrast agent for imaging by X-ray, by magnetic resonance or by ultrasonography, and optionally at least one means of injection for parenteral administration. The means of injection is as defined above.

In said kit, the pharmaceutical composition and the contrast agent are packaged separately and are intended to be mixed just before administration by injection.

In said kit, the at least one contrast agent is as defined above in the description. In particular, the at least one contrast agent is a contrast agent for imaging by X-ray as defined above in the description.

In said kit, the pharmaceutical composition advantageously comprises the microspheres according to the present invention in association with a pharmaceutically acceptable vehicle for administration by injection. Said pharmaceutically acceptable vehicle may be for example, but is not limited to, water for injection, normal saline solution, starch, hydrogel, polyvinylpyrrolidone, polysaccharide, ester of hyaluronic acid and/or plasma. Preferably, in said kit, the pharmaceutical composition advantageously comprises the microspheres according to the present invention in association with normal saline solution or water for injection.

In said kit, the pharmaceutical composition is advantageously packaged directly in a means of injection, in particular in a syringe, suitable for injection of embolization microspheres by a parenteral route.

In said kit, the contrast agent is advantageously packaged in a vial or directly in a means of injection, in particular a syringe, in particular suitable for injection of embolization microspheres by a parenteral route.

In said kit, the ratios of pharmaceutically acceptable vehicle to contrast agent are between 80/20 and 0/100, advantageously between 70/30 and 40/60, preferably 50/50. Advantageously, when the microspheres according to the invention are obtained by polymerization of a reaction mixture comprising 5% to 10%, preferably from 5% to 7% of halogenated monomer as described in the present description, the ratios of pharmaceutically acceptable vehicle to contrast agent are between 70/30 and 0/100, advantageously between 60/40 and 20/80, preferably 50/50. According to another embodiment of the present invention, when the microspheres according to the invention are obtained by polymerization of a reaction mixture not comprising a halogenated monomer as described in the present description, the ratios of pharmaceutically acceptable vehicle to contrast agent are between 80/20 and 0/100.

Figure 1:
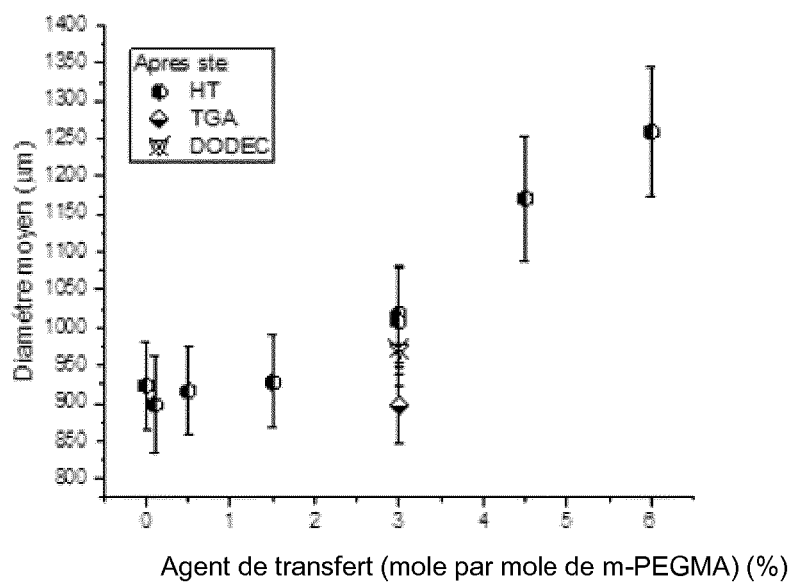
FIG. 1: Average diameter of the microspheres (MS) after sterilization as a function of the concentration of transfer agent.

The examples presented hereunder are intended to illustrate the present invention. Hereinafter, the word "microsphere", whether in the singular or in the plural, will generally be abbreviated to MS.

EXAMPLES

Materials and Methods

Materials 2,2'-Azobis(2-methylpropionitrile) (AIBN), poly(ethylene glycol) methacrylate ($M_n$=300 g·mol$^{-1}$) (PEG), 1-hexanethiol (95%), methacrylic acid (99%), polyvinyl alcohol ($M_n$=30 000-70 000 g·mol$^{-1}$) (PVA), thioglycolic acid (99%), 1-dodecanethiol (98%) were purchased from Sigma-Aldrich. Toluene and acetone were purchased from VWR. NaCl was purchased from Merck. Polyethylene glycol dimethacrylate ($M_n$=1000 g·mol$^{-1}$) (PEGDMA-1000) was purchased from Polysciences Inc. The violet dyes and the iodinated monomers were synthesized in Guerbet's R&D center. All the materials were used as received, without any additional purification.

Methods

Morphology

The morphological properties of the MS obtained were characterized with the Morphologi 4 instrument (Malvern Instruments, United Kingdom). The Morphologi 4 instrument can be used for producing databases of MS images. It is able to show the size distribution of the MS that are measured. 26 different morphological parameters could be determined by the Morphologi 4 instrument. The diameter (µm) was the main parameter to be investigated. The MS were deposited on a sample holder of the Morphologi 4 instrument. 500 MS were imaged and stored in the database of the software for more-thorough analysis. A standard operating procedure (SOP) was used in the imaging process to ensure uniformity of the measurements. After each measurement, the defective MS were excluded from the total of the MS (500 MS). The most reliable method consisted of visually examining each MS and removing them or storing them in the image databases as a function of their defects and their integrity. The histogram, the mean value of the diameter and the standard deviation were also obtained for the intact MS.

Analysis of the Defects:

There are various classes of defects of the microspheres (MS), listed here:

Class 1: Defect-free MS

Class 2: Siamese-twin MS

Class 3: Double-core MS

Class 4: Isolated fractured MS

Class 5: Residues or residues of fractured MS

Class 6: MS pile after sterilization

Class 7: MS core without USPIO

Class 8: Very transparent MS (phantom MS)

Class 9: Stack of MS in a polymer fragment

Class 10: Cracked MS

Class 11: Object of oval shape containing several small MS

Class 12: Deformed MS

In the investigation of defects based on the 500 MS studied, the defective MS were eliminated. The percentage of defect-free MS was therefore calculated:

$$\text{Defect-free } MS\ (\%) = \frac{\text{total quantity of } MS - \text{quantity of defective } MS}{\text{total quantity of } MS} \times 100$$

Dry Extract, Degree of Swelling by Weight

The dry extract is determined as follows: 1 ml of sedimented MS is placed in a 5-ml Eppendorf vial, frozen at −80° C. and lyophilized in a lyophilizer (Heto PowerDry LL 1500, Thermo Scientific) overnight. The weight of the MS after lyophilization is then measured.

Measurement was carried out for three samples and the mean value was taken as the final value of the dry weight of the MS.

Degree of swelling: The same sample preparation as that described above was used for calculating the degree of swelling by weight of the MS:

$$\text{degree of swelling by weight } (Q) = \frac{m_w(g) - m_d(g)}{m_d(g)}$$

where ($m_w$) is the weight in grams of 1 mL of sedimented MS and ($m_d$) is the weight in grams of 1 ml of sedimented microspheres that have been lyophilized. Measurement was carried out for three samples and the mean value was taken as the final value of the degree of swelling by weight.

Rheology and Compressibility

The rheological properties of the MS were measured on an HR2 Discovery rheometer (TA Instruments, USA). Young's modulus is measured using a uniaxial compression mode. A plane-plane type of geometry with plates with a diameter of 50 mm and an initial spacing of 1600 µm was used. The temperature of the samples is maintained at 25° C. by the Peltier effect. Prior to measurement, the normal force is set at zero by the software. A uniform bed with a single layer of microspheres is then deposited on the plate.

A first measurement is performed in order to determine the point of contact with the MS as well as the linear deformation conditions.

For this, the gap between the plates is reduced from 1600 µm to 700 µm at a speed of 16.7 µm/s (1 mm/min) and the normal force is measured. The point of contact corresponds to the gap between the plates for which a normal force begins to be exerted. On continuing to reduce this the gap between the plates, the normal force follows a linear regime as a function of the applied deformation, up to a certain point. The gap between the plates during this divergence corresponds to exit from the linear regime.

A second measurement is then carried out 3 times in succession in order to measure the mean value as well as the error of measurement of Young's modulus. This second measurement consists of placing the upper plate directly at the point of contact and applying an axial strain up to the maximum value of exit from the linear regime. The normal force measured then varies linearly as a function of the applied strain. The slope of this curve corresponds to the Young's modulus.

Other Method Used for Measuring Young's Modulus (Method No. 2)

Compression tests are carried out on single microspheres with a compression machine (Synergy 800, MTS, France), using a 3D-printed piston with a diameter of 15.3 mm. The force exerted is measured with a 2 N force sensor, which provides accurate, repeatable measurements starting from 1 mN. The software TestWorks4 is an interface for controlling the piston and recording the data measured by the sensor. It is necessary to use a lamp (100 W bulb) to illuminate the cell containing the microsphere being analyzed, and to allow the camera to see the microsphere and the piston clearly. The image processing software ImageJ is used for measuring the exact size of the microspheres by measuring the number of pixels in the image. The speed of the piston is fixed at 1 mm/min and the test begins with the piston positioned about 100 µm above the microsphere.

With the data collected (measurements of force, time and displacement), Young's modulus is calculated using the Hertz model, applicable to compression of a sphere between two flat plates.

Injection of the MS

The MS were injected via a microcatheter in order to test their mechanical properties during injection. A solution made up of 30 vol % of contrast product Xenetix® 350 mg iodine/ml and 70 vol % of normal saline solution was prepared. 20 mL of this solution was taken using a 20-mL syringe, and in parallel 2 mL of sedimented MS was taken from the sterilized bottle as described above using a 3-mL syringe.

The two syringes (3 mL and 20 mL) are connected to a three-way tap. The MS are suspended in the aforementioned mixture by performing about 15 to and fro movements between the two syringes.

The 3-ml syringe is used for injecting the solution of MS in suspension in a microcatheter of type Progreat® 2.8F (Terumo) or GlideCath® 4F or 5F (Terumo).

Example 1: Synthesis by Direct Suspension Polymerization of Microspheres (MS) According to the Invention (900-1200 µm)

An aqueous solution of hydrolyzed polyvinyl alcohol and sodium chloride is poured into a reactor and heated to 50° C. The organic phase containing poly(ethylene glycol) methyl ether methacrylate (m-PEGMA) (hydrophilic monomer), poly(ethylene glycol) dimethacrylate (PEGDMA) (cross-linking agent), coloring monomer, methacrylic acid (ionized or ionizable monomer), transfer agent and AIBN (initiator) dissolved in toluene is then fed into the reactor. Stirring is applied with a stirrer of the propeller type at a suitable speed for obtaining droplets of the desired diameter. The temperature is then increased to 80° C. and stirring is continued for 12 hours. The mixture is then filtered on a 40 µm sieve in order to collect the MS. The MS retained by said sieve are then washed 3 times with acetone and then 3 times with water. These washed MS are then sieved between a 900 µm sieve and a 710 µm sieve. The MS collected between these two sieves are then sterilized in an autoclave at 121° C. for 20 minutes, which will have the effect of swelling the MS and obtaining MS of the desired size, i.e. in this case 900 to 1200 µm.

The microspheres synthesized by the method described above then have the following composition (Tables 1 and 1bis):

TABLE 1

| | | MS of size 900-1200 µm |
|---|---|---|
| Process parameters | O/W oil/water volume ratio | 1/6 |
| | Total volume | 980 mL |
| | Stirring speed | 110 rpm |
| Aqueous phase | Volume of aqueous phase | 840 mL |
| | PVA 30-70 kDa | 0.25 wt % relative to the aqueous phase |
| | NaCl | 7 wt % relative to the aqueous phase |
| Organic phase | Ratio weight of monomers/weight of organic phase | 35% |
| | m-PEGMA | 84.96 mol %/total moles of monomers |
| | PEGdMA | 5 mol %/total moles of monomers |
| | MA | 10 mol %/total moles of monomers |
| | Transfer agent | X mol %/moles of m-PEGMA |
| | Dye | 0.04 mol %/total moles of monomers |
| | AIBN | 1 mol %/moles of methacrylate functions |

TABLE 1bis

| Batch | 1 | 2 | 3 | 4 | 5 | 6 | 7 | 8 | 9 | L9 |
|---|---|---|---|---|---|---|---|---|---|---|
| Transfer agent | — | HT | HT | HT | HT | HT | HT | TGA | DODEC | BTCM |
| X = Ratio (in moles/moles of m-PEGMA) | 0% | 0.1% | 0.5% | 1.5% | 3% | 4.5% | 6% | 3% | 3% | 3% |

HT: 1-hexanethiol,
TGA: thioglycolic acid,
DODEC: 1-dodecanethiol,
BTCM: bromotrichloromethane

Example 2: Size of the Microspheres from Example 1

The average diameter of the microspheres is measured after sterilization, for each of batches 1 to 9 and L9 to evaluate the effect of the concentration of transfer agent on the size of the MS.

The MS were sterilized in accordance with the procedure described above.

The average diameter after sterilization of the calibrated MS (900-1200) for each of the batches is shown in FIG. 1.

The diameter of the MS after sterilization increases from 923 µm to 1259 µm as the concentration of HT increases (batches 1, 2, 3, 4, 5, 6 and 7). The more transfer agent the microspheres contain, the larger their size.

Example 3: Percentage of Nondefective Microspheres from Example 1

Figure 2:
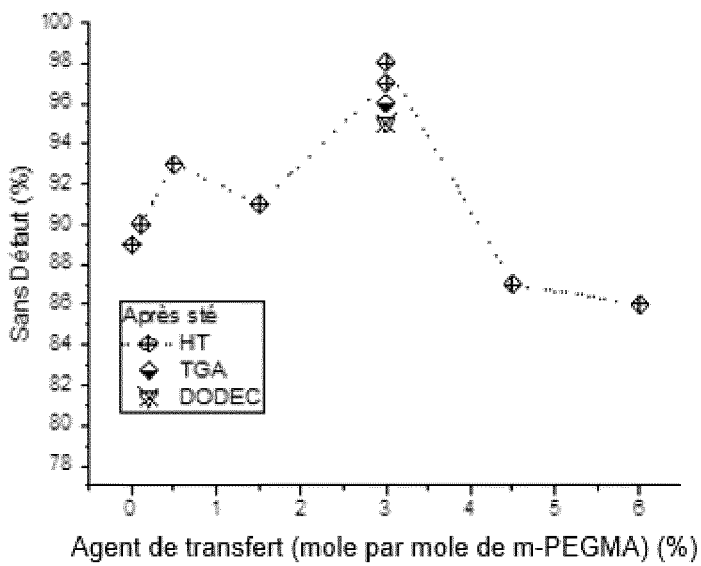
FIG. 2: Percentage of defect-free microspheres as a function of the concentration of transfer agent.

The percentage of defective MS was calculated by the method described above on a sample of MS with a size of 900-1200 µm comprising different concentrations of HT as transfer agent or transfer agents of a different kind (batches 1 to 9 and L9). The results are shown in FIG. 2.

From 0% to 1.5% of HT (batches 1 to 4), the percentage of defect-free MS varies from 89% to 91%. Starting from 1.5% of transfer agent, this percentage increases and reaches a maximum (more than 95%) at 3% of transfer agent (batches 5, 8, 9 and L9).

Figure 3:
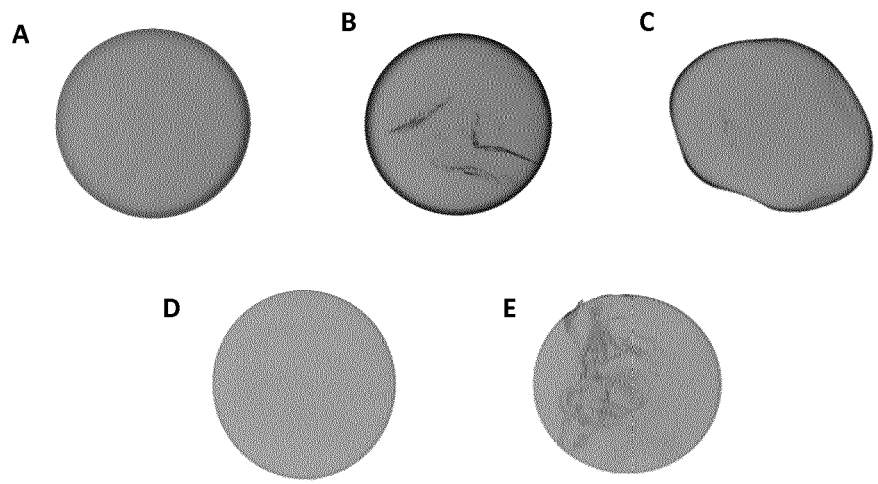
FIG. 3: Examples of microspheres. A: defect-free with 0% of hexanethiol; B: fractured with 0% of hexanethiol; C: deformed with 0% of hexanethiol; D: defect-free with 6% of hexanethiol; E: fractured with 6% of hexanethiol.

The type of defect differs depending on the concentration of transfer agent in the microsphere. FIG. 3 shows the two examples of morphological defects observed most often. At a concentration of HT between 0% and 1.5% of HT, the MS are most often either cracked (B), or deformed (C).

At concentrations of 6% of HT or more in the MS, there are numerous MS that have burst (see FIG. 3).

Example 4: Dry Extract of the Microspheres from Example 1

Figure 4:
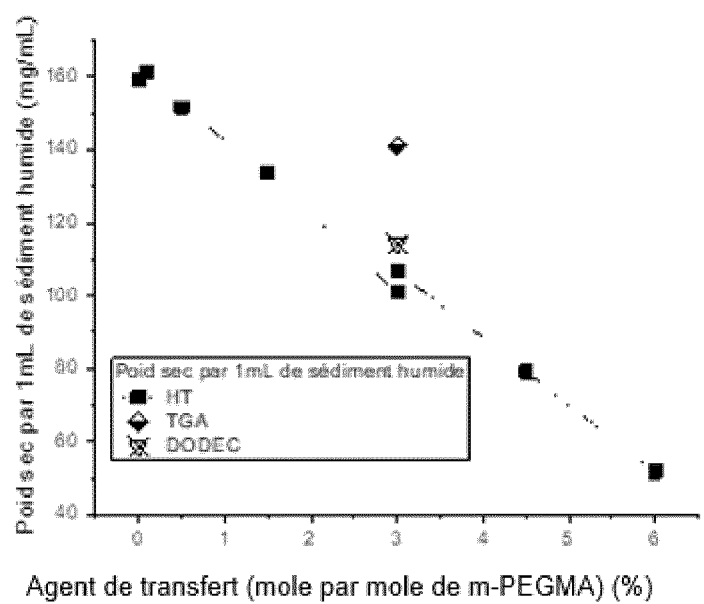
FIG. 4: Dry extract as a function of the concentration of transfer agent.

FIG. 4 shows the dry extract of the MS (mg/ml), calculated by the method described above, as a function of the concentration or nature of the transfer agent.

The dry extract (mg) for a given volume of MS decreases linearly when the concentration of HT increases (batches 1, 2, 3, 4, 5, 6 and 7). The dry extract of the MS of batch L9 is about 101 mg/mL. Without transfer agent, the dry mass of 1 mL of sedimented MS is about 159 mg. At 6% of HT, this dry extract is only about 52 mg.

Example 5: Degree of Swelling of the Microspheres from Example 1

Figure 5:
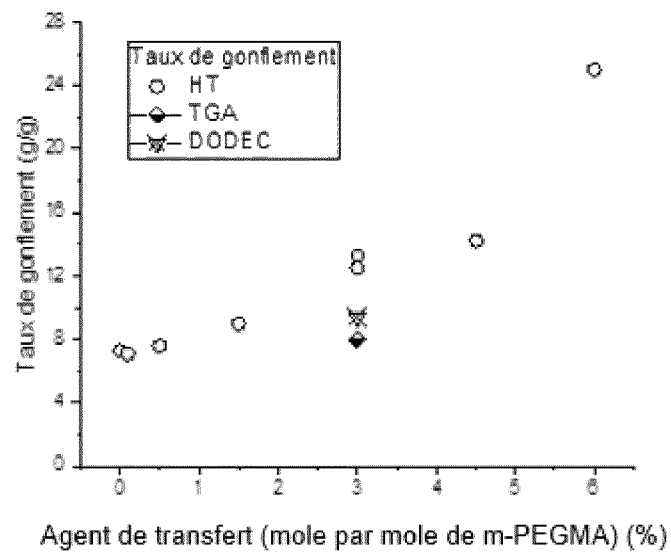
FIG. 5: Degree of swelling as a function of the concentration of transfer agent.

The degree of swelling of the microspheres was determined by the method described above on batches 1 to 9 and L9 in order to evaluate the effects of the concentration and nature of the transfer agent. The results are shown in FIG. 5. It can be seen that as the concentration of HT increases, the degree of swelling obtained increases. For a concentration of HT between 0% and 6%, the degree of swelling by weight increases from 7 to 26 g/g. It is about 8.88% for the MS of batch L9.

The MS without transfer agent have therefore swollen less and have a very high dry mass. These data show that the various transfer agents tested give a suitable degree of swelling.

Example 6: Rheology and Compressibility of the Microspheres from Example 1

Figure 6:
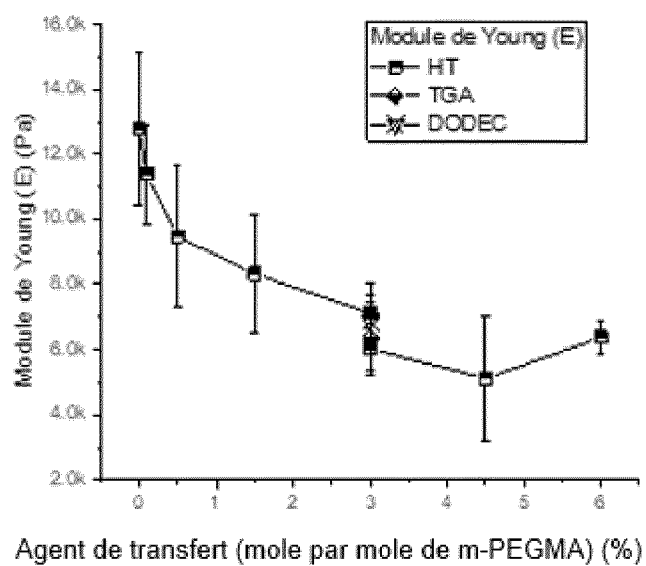
FIG. 6: Young's modulus as a function of the concentration of transfer agent.

The compressibility of the microspheres can be characterized by measuring Young's modulus by the method described above. The Young's moduli of batches 1 to 9 are shown in FIG. 6. The results obtained with method No. 2 for measurement of Young's modulus gave quite similar results.

It can be seen that Young's modulus decreases from about 13 kPa to about 6 kPa as the concentration of HT increases from 0% to 3% and then reaches a plateau at about 6 kPa for the higher concentrations (4.5% and 6%).

The MS containing between 0% and 0.5% of HT (batches 1 to 4) are more solid and rigid and are unsuitable for injection. Starting from 1.5% of HT, the values of Young's modulus of the MS go below 10 kPa, which is the target limit of the present invention, and are therefore softer and more flexible. Starting from a concentration of 3%, the MS become softer and more flexible.

At equal concentration of transfer agent, here 3%, all the MS have the same plateau value of about 6 kPa.

When the concentration of transfer agent is between 1.5% and less than 6%, the compressibility of the MS makes them suitable for injection by microcatheter.

Example 7: Injection of the Microspheres from Example 1 in a Microcatheter

Each of the batches 1 to 9 and L9 of MS was injected in 4Fr and 5Fr microcatheters. No blockage was observed. For batch 7 (6% of HT), the MS did not tolerate preparation for injection, and they all broke. Therefore the mechanical properties of the MS obtained with 6% of transfer agent are not compatible for injection by microcatheter.

Example 8: Synthesis by Direct Suspension Polymerization of Microspheres Intended to be Loaded According to the Invention (100-300 μm)

An aqueous solution of hydrolyzed polyvinyl alcohol and sodium chloride is poured into a reactor and heated to 50° C. The organic phase containing poly(ethylene glycol) methyl ether methacrylate (m-PEGMA) (hydrophilic monomer), poly(ethylene glycol) dimethacrylate (PEGDMA) (cross-linking agent), methacrylic acid (MA) (ionizable monomer), hexanethiol (HT) (transfer agent), violet dye (1-(4-((2-methacryloxyethyl)oxy)phenylamino)anthraquinone), the suspension of iron nanoparticles and AIBN (initiator) dissolved in toluene is then fed into the reactor. Stirring is applied with a stirrer of the propeller type at a suitable speed for obtaining droplets of the desired diameter. The temperature is then increased to 80° C. and stirring is continued for 8 hours. The mixture is then filtered and the microspheres are washed with acetone and then with water before being sieved and then autoclaved.

Table 2 below presents the main parameters and the composition of the organic phase and of the aqueous phase:

TABLE 2

| | | 100-300 μm |
|---|---|---|
| Process parameters | O/W (oil/water volume ratio) | 1/11 |
| | Total volume | 1060 mL |
| | Stirring speed | 140 rpm |
| Aqueous phase | Volume of aqueous phase | 972 mL |
| | PVA 13-23 kDa | 1 wt % relative to the aqueous phase |
| | NaCl | 3 wt % relative to the aqueous phase |
| Organic phase | Ratio: weight of monomers/weight of organic phase | 56% |
| | m-PEGMA | 64.96 mol %/total moles of monomers |
| | PEGdMA | 5 mol %/total moles of monomers |
| | MA | 30 mol %/total moles of monomers |
| | HT | 3 mol %/moles of m-PEGMA |
| | Dye | 0.04 mol %/total moles of monomers |
| | USPIO | 1 vol %/volume of organic phase |
| | AIBN | 1 mol %/moles of methacrylate functions |

Example 8Bis: Synthesis by Direct Suspension Polymerization of Microspheres (MS) without Ionizable Monomer According to the Invention (900-1200 μm) and Evaluation of the Loading Capacity Synthesis Off the 900-1200 μm Microspheres An aqueous solution of hydrolyzed polyvinyl alcohol and sodium chloride is poured into a reactor and heated to 50° C. The organic phase containing poly(ethylene glycol) methyl ether methacrylate (m-PEGMA) (hydrophilic monomer), poly(ethylene glycol) dimethacrylate (PEGDMA) (cross-linking agent), coloring monomer, hexanethiol (transfer agent) and AIBN (initiator) dissolved in toluene is then fed into the reactor. Stirring is applied with a stirrer of the propeller type at a suitable speed for obtaining droplets of the desired diameter. The temperature is then increased to 80° C. and stirring is continued for 12 hours. The mixture is then filtered on a 40 μm sieve in order to collect the microspheres. The microspheres retained by said sieve are then washed 3 times with acetone and then 3 times with water. These washed microspheres are then sieved between a 900 μm sieve and a 710 μm sieve. The microspheres collected between these two sieves are then sterilized in an autoclave at 121° C. for 20 minutes, which will have the effect of swelling the microspheres and obtaining microspheres of the desired size, i.e. in this case 900 to 1200 μm. The microspheres synthesized by the method described above then have the following composition:

Table 3 below presents the main parameters and the composition of the organic phase and of the aqueous phase:

TABLE 3

|  |  | Microspheres 900-1200 μm batch L8 |
|---|---|---|
| Process parameters | O/W (oil/water) volume ratio | 1/6 |
|  | Total volume | 490 mL |
|  | Volume of organic phase | 70 mL |
|  | Stirring speed | 100 rev/min |
|  | PVA (30-70 kDa) | 0.25% (by weight relative to the aqueous phase) |
|  | NaCl | 7% (by weight relative to the aqueous phase) |
| Organic phase | Weight of monomer/ weight of the organic phase (%) | 35% |
|  | Hexanethiol | 3 mol %/moles of m-PEGMA |
|  | AIBN | 1 mol %/moles of methacrylate function |
| Monomer phase | m-PEGMA | 94.96 mol %/total moles of monomers |
|  | PEGDMA | 5 mol %/total moles of monomers |
|  | MA | 0 mol %/total moles of monomers |
|  | Dye | 0.04 mol %/total moles of monomers |

Characterizations:

The dry extract (dry weight) is determined as follows: 1 ml of sedimented MS is placed in a 5-ml Eppendorf vial, frozen at −80° C. and lyophilized in a lyophilizer (Heto PowerDry® LL 1500, Thermo Scientific) overnight. The weight of the microspheres after lyophilization is then measured. The measurement was carried out for three samples and the mean value was taken as the final value of the dry mass of the MS.

The average diameter is measured by analysis of microscopy images on 2000 microspheres (Morphologi 4, Malvern).

The test of injectability in microcatheters is performed with 1 mL of sediment of microspheres suspended beforehand in 10 mL of iodinated contrast medium (70% of Optiray® 300, Guerbet, 30% of normal saline solution). A homogeneous suspension of microspheres in a 3-mL syringe is then injected in the microcatheter. The microcatheters, supplied by the Terumo company, were selected such that their inside diameter is just slightly greater than the average diameter of the microspheres. The resistance felt during injection of the microspheres in the microcatheter is recorded (Table 3Bis). Blockage during injection would indicate injection failure. After injection, the microspheres are observed in the microscope in order to verify whether the microspheres regain their spherical shape.

Results of the Characterizations:

TABLE 3bis

| Batches | MA (%) | Dry weight per ml of wet sediment (mg/mL) | Average diameter (μm) | Young's modulus (method 2) (kPa) | Injectability in a 4Fr microcatheter (GlideCath ®) |
|---|---|---|---|---|---|
| Batch L8 | 0 | 72 | 983 | 6.98 ± 0.95 | No blockage, very low resistance |

100-300 μm microspheres are also synthesized without methacrylic acid (same composition as the microspheres in example 8 with 0% of methacrylic acid (MA) and 94.96% of m-PEGMA) and then sterilized by autoclaving. Their capacity for loading with doxorubicin is evaluated and compared to that of microspheres as synthesized according to example 8.

Loading with doxorubicin: the target of loading is 37.5 mg of doxorubicin per ml of microspheres. For this, 3.8 mL of doxorubicin-HCl (Adriblastine®, Pfizer) in solution in water at 2.5 mg/mL is added to 250 μL of wet sediment of microspheres. After mixing by inversion, the suspension is made up to 6 mM with sodium bicarbonate (Lavoisier). Loading is carried out at room temperature, with stirring for one hour. Measurement of the residual amount of doxorubicin (absorbance at 490 nm) present in the supernatants serves for determining the amount of drug loaded on the microspheres.

Results (Table 4):

TABLE 4

|  | Doxorubicin loading (mg of doxo/mL of wet sediment) | Efficiency of loading % |
|---|---|---|
| Without methacrylic acid | 29.3 | 82.6 |
| With methacrylic acid 30% | 35.3 | 99.6 |

The efficiency of loading is calculated from the following equation:

$$LC \text{ (mg of drug/mL of } MS) = \frac{m_{Drug\ initial} - C_{Drug\_sup} * V_{sup}}{V_{MS}}$$

$$LE\ (\%) = \frac{LC}{m_{Drug\ initial}}$$

LC: Loading capacity
LE: Loading efficiency
$M_{Drug\ initial}$: Amount of drug dissolved
$C_{Drug\_sup}$: Concentration of the drug in the supernatant after loading
$V_{sup}$: Volume of the supernatant
$V_{MS}$: Volume of microspheres The efficiency of loading without methacrylic acid is 82.6%, compared to 99.6% in the presence of 30% of methacrylic acid. The capacity of the microspheres without ionizable monomer for loading of doxorubicin can be explained by the establishment of hydrophobic or van der Waals bonds. In the presence of ionizable monomer, besides these bonds, doxorubicin is loaded by electrostatic bonds. The kinetics and the loading capacities are improved thereby.

Example 9: Synthesis by Direct Suspension Polymerization of Polymers Containing 5% of MAOETIB According to the Invention in the Form of Microspheres of Size 700-900 µm An aqueous solution of hydrolyzed polyvinyl alcohol and sodium chloride is poured into a reactor and heated to 50° C. The organic phase containing poly(ethylene glycol) methyl ether methacrylate (m-PEGMA) (hydrophilic monomer), poly(ethylene glycol) dimethacrylate (PEGDMA) (cross-linking agent), methacrylic acid (MA) (ionizable monomer), MAOETIB (halogenated monomer), hexanethiol (transfer agent), violet dye (1-(4-((2-methacryloxyethyl)oxy)phe-nylamino)anthraquinone) and AIBN (initiator) dissolved in toluene is then fed into the reactor. Stirring is applied with a stirrer of the propeller type at a suitable speed for obtaining droplets of the desired diameter. The temperature is then increased to 80° C. and stirring is continued for 12 hours. The mixture is then filtered and the microspheres are washed with acetone and then with water before being sieved and then autoclaved.

Table 5 below presents the main parameters and the composition of the organic phase.

TABLE 5

|  |  | 700-900 µm |
|---|---|---|
| Process parameters | O/W (oil/water volume ratio) | 1/6 |
|  | Volume of organic phase | 140 mL |
|  | Stirring speed | 105 RPM |
|  | PVA (30-70 kDa) | 0.25% (by weight of the aqueous phase) |
|  | NaCl | 7% (by weight of the aqueous phase) |
| Organic phase | Ratio: weight of monomers/weight of organic phase | 50% |
|  | Hexanethiol | 3 mol %/moles of mPEGma |
|  | AIBN | 1 mol %/moles of methacrylate function |
| Monomer phase | m-PEGMA | 79.96 mol %/total moles of monomers |
|  | PEGDMA | 5 mol %/total moles of monomers |
|  | Methacrylic acid | 10 mol %/total moles of monomers |
|  | MAOETIB | 5 mol %/total moles of monomers |
|  | Dye | 0.04 mol %/total moles of monomers |

Example 10: Suspending the Microspheres from Example 9 in a 50/50 Mixture of Contrast Agent and Normal Saline Solution, and Comparison with Equivalent Microspheres without MAOETIB 2 ml, of sediment of beads is added to a mixture of 10 ml, of 50/50 normal saline solution/contrast agent (5 ml, of Optiray® 300 mgI/mL and 5 ml, of normal saline solution). The mixture is passed 5 times through a three-way tap using 20-mL syringes.

The syringe containing the mixture is then positioned vertically and the destabilization of the mixture is observed; the microspheres then rise to the surface. The time corresponding to a destabilization interface arriving at mid-height of the syringe is measured.

For the particles of size 700-900 µm not containing MAOETIB, this time is 20 seconds, whereas it is 120 seconds for the particles containing 5% of MAOETIB. This destabilization time even increases to 220 seconds if 7% of MAOETIB is added.

The presence of MAOETIB makes it possible to stabilize the suspension.

Example 11: Synthesis by Direct Suspension Polymerization of Polymers of Various Kinds in the Form of Microspheres of Size 700-900 µm Synthesis An aqueous solution of hydrolyzed polyvinyl alcohol and sodium chloride is poured into a reactor and heated to 50° C. The organic phase containing hydrophilic monomer, cross-linking agent, coloring monomer, transfer agent, the halogenated monomer if applicable, the ionizable monomer if applicable and AIBN (initiator) dissolved in toluene is then fed into the reactor.

Stirring is applied with a stirrer of the propeller type at a suitable speed for obtaining droplets of the desired diameter. The temperature is then increased to 80° C. and stirring is continued for 12 hours. The mixture is then filtered on a 40 µm sieve in order to collect the microspheres. The microspheres retained by said sieve are then washed 3 times with acetone and then 3 times with water. These washed microspheres are then sieved between a 900 µm sieve and a 710 µm sieve. The microspheres collected between these two sieves are then sterilized in an autoclave at 121° C. for 20 minutes, which will have the effect of swelling the microspheres and obtaining microspheres of the desired size, i.e. in this case 700 to 900 µm. Table 6 below presents the main parameters and the composition of the organic phase.

TABLE 6

|  |  | batch L10 700-900 µm | batch L12 700-900 µm |
|---|---|---|---|
| Process parameters | O/W (oil/water) volume ratio | 1/6 | 1/6 |
|  | Total volume | 980 mL | 980 mL |
|  | Volume of organic phase | 140 mL | 140 mL |
|  | Stirring speed | 100 rev/min | 100 rev/min |
|  | PVA (30-70 kDa) (by weight relative to the aqueous phase) | 0.25% | 0.25% |
|  | NaCl (by weight relative to the aqueous phase) | 7% | 7% |
| Organic phase | Weight of monomer/weight of the organic phase | 35% | 35% |
|  | Transfer agent (moles/moles of monomer) | Hexanethiol 3% | Hexanethiol 3% |
|  | AIBN (moles/moles of methacrylate function) | 1% | |
| Monomer phase (mol %/ total moles of monomers) | Hydrophilic monomer | N-vinylpyrrolidone 74.96% | MPEGMA 79.96% |
|  | Crosslinking agent | PEG-diacrylate 5% | PEGDMA 5% |
|  | Ionizable monomer | Methacrylic acid 20% | Methacrylic acid 10% |

TABLE 6-continued

|  | batch L10<br>700-900 μm | batch L12<br>700-900 μm |
| --- | --- | --- |
| Halogenated<br>monomer | / | 2-(2-(2-(2,3,5-<br>triiodobenz-<br>amido) ethoxy)<br>ethyl<br>methacrylate<br>5% |
| Dye | 0.04% | 0.04% |

Characterization and Results

Characterization is carried out in the same way as in example 8bis and the results are presented in Table 7.

TABLE 7

| Batches | Dry weight<br>per ml of<br>wet<br>sediment<br>(mg/mL) | Average<br>diameter<br>(μm) | Young's<br>modulus<br>(method 2) | Injectability<br>in GlideCath ®<br>4Fr<br>microcatheter<br>(ID(1) =<br>1030 μm) |
| --- | --- | --- | --- | --- |
| Batch L10 | 60.4 | 834 | 1.01 ± 0.25 | No blockage,<br>low resistance |
| Batch L12 | 80.4 | 837 | 7.59 ± 0.75 | No blockage,<br>low resistance |

Example 12: Synthesis by Direct Suspension Polymerization of Polymers Containing Different Amounts of MAOETIB According to the Invention in the Form of Microspheres of Size 100-300 μm Synthesis:

An aqueous solution of hydrolyzed polyvinyl alcohol and sodium chloride is poured into a reactor and heated to 50° C. The organic phase containing poly(ethylene glycol) methyl ether methacrylate (m-PEGMA) (hydrophilic monomer), poly(ethylene glycol) dimethacrylate (PEGDMA) (crosslinking agent), methacrylic acid (MA) (ionizable monomer), MAOETIB (halogenated monomer), hexanethiol (transfer agent), violet dye (1-(4-((2-methacryloxyethyl)oxy)phenylamino)anthraquinone) and AIBN (initiator) dissolved in toluene is then fed into the reactor. Stirring is applied with a stirrer of the propeller type at a suitable speed for obtaining droplets of the desired diameter. The temperature is then increased to 80° C. and stirring is continued for 12 hours. The mixture is then filtered and the microspheres are washed with acetone and then with water before being sieved and then autoclaved.

Table 8 below presents the main parameters and the composition of the organic phase.

TABLE 8

|  |  | Microspheres 100-300 μm | | |
| --- | --- | --- | --- | --- |
|  |  | L13 | L14 | L15 |
| Process<br>parameters | O/W (oil/water) volume ratio | | 1/6 | |
|  | Total volume | 1060 mL | 1060 mL | 1200 mL |
|  | Volume of organic phase | 88 mL | 88 mL | 130 mL |
|  | Stirring speed | 150 rpm | 150 rpm | 150 rpm |
|  | PVA (13-23 kDa) | 0.25% (by weight relative to the aqueous phase) | | |

TABLE 8-continued

|  |  | Microspheres 100-300 μm | | |
| --- | --- | --- | --- | --- |
|  |  | L13 | L14 | L15 |
|  | NaCl | 7% (by weight relative to the aqueous phase) | | |
| Organic<br>phase | Weight of<br>monomer/weight of<br>the organic phase<br>(%) | 56% | 50% | 50% |
|  | Hexanethiol | 3 mol %/moles of<br>m-PEGMA | | |
|  | AIBN | 1 mol %/moles of<br>methacrylate function | | |
| Monomer<br>phase (in<br>moles/total<br>moles of<br>monomers) | m-PEGMA | 84.96% | 79.96% | 64.96% |
|  | PEGDMA | | 5% | |
|  | MA | | 10% | |
|  | MAOETIB | 0% | 5% | 20% |
|  | Dye | | 0.04% | |

Example 13: Suspending Microspheres from Example 12 with Different Levels of MAOETIB in a 50/50 Mixture of Contrast Agent and Normal Saline Solution 2 ml, of sediment of beads is added to a mixture of 10 ml, of 50/50 normal saline solution/contrast agent (5 mL of Xenetix® 350 mgI/mL and 5 mL of normal saline solution). The mixture is passed 5 times through a three-way tap using 20-mL syringes. The syringe containing the mixture is then positioned vertically and destabilization of the mixture is observed, either through frothing or through sedimentation depending on the concentration of MAOETIB. The time corresponding to a destabilization interface arriving at mid-height of the syringe is measured. The results are presented in Table 9.

TABLE 9

| Micro-<br>sphere | MAOETIB<br>% | Mid-height<br>destabilization<br>time | Type<br>of<br>destabilization |
| --- | --- | --- | --- |
| L13 | 0 | 6 min | frothing |
| L14 | 5 | 12 min | frothing |
| L15 | 20 | 2.5 min | sedimentation |

Adding a small amount of MAOETIB makes it possible to delay frothing by bringing the density of the microspheres closer to that of the suspension medium. However, beyond a certain concentration, the density of the microspheres becomes too high and they sediment rapidly.

The invention claimed is:

1. Nonbiodegradable embolization microspheres comprising a crosslinked matrix, said matrix being based on at least:
   a) 45% to 95% of hydrophilic monomer selected from N-vinylpyrrolidone and poly(ethylene glycol) methyl ether methacrylate;
   b) 2% to 7% of a nonbiodegradable, linear or branched hydrophilic crosslinking monomer of the following formulas (IIa) or (IIb):

$$(CH_2=(CR_7))CO—NH-A-HN—OC(CR_8=CH_2) \quad (IIa),$$

$$(CH_2=(CR_7))CO—O-A-O—OC(CR_8=CH_2) \quad (IIb),$$

in which $R_7$ and $R_8$ represent, independently of one another, H or a $(C_1—C)$alkyl; and A represents, alone or with at least one of the atoms to which it is bound, a polyethylene glycol (PEG) having a length in the range from 200 to 10,000 g/mol; and c) 1.5% to 4.5% of transfer agent selected from alkyl halides and cycloaliphatic or aliphatic thiols, and optionally having another functional group selected from the amino, hydroxy and carboxy groups, the percentages of the monomers a) and b) being given in moles relative to the total number of moles of monomers and the percentages of compound c) being given in moles relative to the number of moles of the hydrophilic monomer a).

2. The nonbiodegradable embolization microspheres of claim 1, wherein the crosslinked matrix is based on 1.5% to 3% of transfer agent in moles relative to the number of moles of the hydrophilic monomer a).

3. The nonbiodegradable embolization microspheres of claim 1, wherein the hydrophilic monomer a) is poly(ethylene glycol) methyl ether methacrylate.

4. The nonbiodegradable embolization microspheres of claim 1, wherein the transfer agent is selected from thioglycolic acid, 2-mercaptoethanol, dodecanethiol, hexanethiol and mixtures thereof.

5. The nonbiodegradable embolization microspheres of claim 1, wherein the matrix is further based on at least one ionized or ionizable monomer of the following formula (II):

(CH$_2$=CR$_9$)-M-E           (III)

in which:

R$_9$ represents H or a (C$_1$-C$_6$) alkyl;

M represents a single bond or a divalent radical having from 1 to 20 carbon atoms;

E represents an ionized or ionizable group, E advantageously being selected from the group consisting of COOH, COO—, SO$_3$H, SO$_3^-$, PO$_4$H$_2$, PO$_4$H$^-$, PO$_4^{2-}$, NR$_{10}$R$_{11}$, NR$_{12}$R$_{13}$R$_{14}^+$, R$_{10}$, R$_{11}$, R$_{12}$, R$_{13}$ and R$_{14}$ represent, independently of one another, H or a (C$_1$-C$_6$)alkyl.

6. The nonbiodegradable embolization microspheres of claim 5, loaded with a drug, an active substance, a diagnostic agent or macromolecules, the drug, the active substance and the diagnostic agent.

7. The nonbiodegradable embolization microspheres comprising a crosslinked matrix of claim 6, wherein the drug or the active substance is selected from the group consisting of anti-inflammatory agents, local anesthetics, analgesics, antibiotics, anticancer agents, steroids, antiseptics and a mixture thereof.

8. The nonbiodegradable embolization microspheres of claim 6, wherein the macromolecules are selected from the group consisting of enzymes, antibodies, cytokines, growth factors, clotting factors, hormones, plasmids, antisense oligonucleotides, siRNA, ribozymes, DNA enzyme, aptamers, anti-inflammatory proteins, bone morphogenetic proteins (BMP), pro-angiogenic factors, vascular endothelial growth factors (VEGF), TGF-beta, angiogenesis inhibitors and mixtures thereof.

9. The nonbiodegradable embolization microspheres of claim 1, wherein the matrix is further based on at least one colored monomer of the following general formula (V):

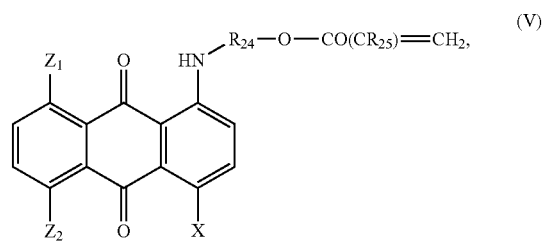

in which,

Z$_1$ and Z$_2$ represent, independently of one another, H or OR$_{26}$, R$_{26}$ representing H or a (C$_1$-C$_6$)alkyl;

X represents H or a halogen;

R$_{24}$ represents a group selected from linear or branched (C$_1$-C$_6$)alkylene, (C$_5$-C$_{36}$)arylene, (C$_5$-C$_{18}$)arylene-O—R$_{27}$, (C$_5$-C$_{18}$)heteroarylene and (C$_5$-C$_{18}$)heteroarylene-O—R$_{28}$, R$_{27}$ and R$_{28}$ representing a (C$_1$-C$_6$) alkyl or a (C$_1$-C$_6$)alkylene, R$_{25}$ represents H or a (C$_1$-C$_6$)alkyl.

10. The nonbiodegradable embolization microspheres of claim 1, wherein the matrix is further based on 5% to 15%, of a halogenated monomer the percentage of said halogenated monomer being given in moles relative to the total number of moles of monomers.

11. The nonbiodegradable embolization microspheres comprising a crosslinked matrix comprising at least one halogenated monomer of claim 10, wherein the halogenated monomer corresponds to (triiodobenzoyl)oxo ethyl methacrylate (MAOETIB) of the following formula:

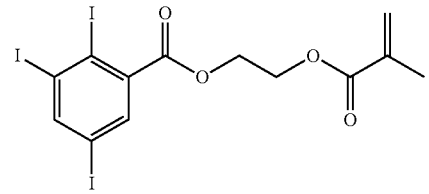

12. The nonbiodegradable embolization microspheres comprising a crosslinked matrix of claim 1, wherein the matrix is moreover based on particles visible in magnetic resonance imaging (MRI).

13. A pharmaceutical composition comprising the nonbiodegradable embolization microspheres of claim 1, in association with a pharmaceutically acceptable vehicle.

14. A kit comprising the pharmaceutical composition of claim 13, in association with a pharmaceutically acceptable vehicle for parenteral administration, and at least one means of injection.

15. A kit comprising the pharmaceutical composition of claim 13 and at least one contrast agent for imaging by X-ray, by magnetic resonance or by ultrasonography, and optionally at least one means of injection for parenteral administration, the pharmaceutical composition and the at least one contrast agent being packaged separately.

16. The nonbiodegradable embolization microspheres comprising a crosslinked matrix of claim 1, wherein the cycloaliphatic or aliphatic thiols have from 2 to 24 carbon atoms.

17. The nonbiodegradable embolization microspheres comprising a crosslinked matrix of claim 5, wherein M is a single bond.

18. The nonbiodegradable embolization microspheres comprising a crosslinked matrix of claim 9, wherein the colored monomer corresponds to formula (Vb):

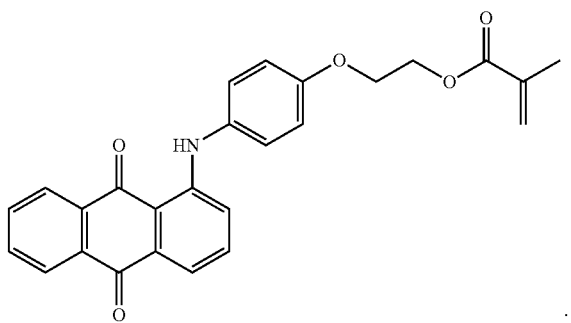

(Vb)

19. The nonbiodegradable embolization microspheres comprising a crosslinked matrix of claim 10, wherein the halogenated monomer is of formula (IV):

$$(CH_2=CR_{15})—CO—Y \qquad (IV)$$

in which
Y represents O—W, (O—$R_{16}$)$_p$—W, (NH—$R_{16}$)$_p$—W or NH—W, W representing Ar, L-Ar, and p being an integer between 1 and 10, in which:
Ar represents a ($C_5$-$C_{36}$)aryl or ($C_5$-$C_{36}$)heteroaryl group, said group being substituted with one, two or three atoms of iodine and/or of bromine, and optionally substituted with one to four groups selected from ($C_1$-$C_{10}$)alkyl, —$NR_aR_b$, —$NR_cCOR_d$, —$COOR_e$, —$OR_f$, —$OCOR_g$, —$CONR_hR_i$, —$OCONR_jR_k$, —$NR_lCOOR_o$, —$N_rCONR_sR_t$, —$OCOOR_u$, and —$COR_v$;
L represents —($CH_2$)$_n$—, —(HCCH)$_n$—, —O—, —S—, —SO—, —SO$_2$—, —OSO$_2$—, —$NR_{17}$—, —CO—, —COO—, —OCO—, —OCOO—, —$CONR_{18}$—, —$NR_{19}CO$—, —$OCONR_{20}$—, —$NR_{21}COO^-$ or —$NR_{22}CONR_{23}$—, n being an integer from 1 to 10;
$R_{17}$ to $R_{23}$ and $R_a$ to $R_v$ represent, independently of one another, a hydrogen atom, a ($C_1$—$C_{10}$)alkyl, said ($C_1$-$C_{10}$)alkyl optionally being substituted with 1 to 10 OR' groups, or a group —($CH_2$—$CH_2$—O)$_q$—R', R' being a hydrogen atom or a —($C_1$-$C_6$)alkyl, q being an integer between 1 and 10, preferably between 1 and 5;
$R_{15}$ represents H or a ($C_1$-$C_6$)alkyl;
$R_{16}$ represents a group selected from ($C_1$-$C_{36}$)alkylene, ($C_3$-$C_{36}$)cycloalkylene, ($C_2$-$C_{36}$)alkenylene, ($C_3$-$C_{36}$)cycloalkenylene, ($C_2$-$C_{36}$)alkynylene, ($C_3$-$C_{36}$)cycloalkynylene, ($C_5$-$C_{36}$)arylene and ($C_5$-$C_{36}$)heteroarylene,
the percentage of said halogenated monomer being given in moles relative to the total number of moles of monomers.

20. The pharmaceutical composition of claim 13, wherein the pharmaceutically acceptable vehicle is for parenteral administration.

\* \* \* \* \*